United States Patent [19]

Valimont et al.

[11] 4,420,361
[45] Dec. 13, 1983

[54] APPARATUS FOR ALIGNING BENT GLASS SHEETS FOR ASSEMBLY INTO BENT GLASS SHEET SANDWICHES

[75] Inventors: James L. Valimont, Cheswick; Barry L. Shadle, Leechburg, both of Pa.

[73] Assignee: PPG Industries, Inc., Pittsburgh, Pa.

[21] Appl. No.: 419,271

[22] Filed: Sep. 17, 1982

Related U.S. Application Data

[62] Division of Ser. No. 287,608, Jul. 28, 1981, Pat. No. 4,367,107.

[51] Int. Cl.³ ...................... B32B 17/10; B32B 17/04; B65H 29/24
[52] U.S. Cl. ..................................... 156/556; 414/28; 198/345; 198/434
[58] Field of Search ................ 156/99, 102, 103, 104, 156/106, 107, 152, 156, 196, 282, 285, 286, 306.6, 309.9, 312, 313, 321, 322, 364, 443, 475, 538, 555, 556, 557, 563; 414/42, 72, 121, 737; 428/437; 65/54, 55, 107, 273; 52/789; 425/388; 271/236, 238, 240; 198/339, 345, 434, 456; 193/35 C

[56] References Cited

U.S. PATENT DOCUMENTS

| | | | |
|---|---|---|---|
| 1,821,413 | 9/1931 | Whitehouse | 264/553 |
| 2,205,003 | 6/1940 | Walters | 49/81.5 |
| 2,317, | | | |
| 2,890, | | | |
| 2,920,989 | 1/1960 | Lochran et al. | 154/2.7 |
| 3,488,414 | 1/1970 | Naples | 425/388 |
| 3,499,744 | 3/1970 | Tolliver | 65/43 |
| 3,518,137 | 6/1970 | Hamilton | 156/104 |
| 3,638,564 | 2/1972 | Prange et al. | 101/35 |
| 3,701,643 | 10/1972 | Frank | 65/273 |
| 3,808,077 | 4/1974 | Rieser et al. | 156/102 |
| 3,828,520 | 8/1974 | Merritt | 425/388 |
| 3,833,251 | 9/1974 | Creskoff | 294/64 R |
| 3,944,461 | 3/1976 | Ogron | 156/538 |
| 3,992,182 | 11/1976 | Frank | 198/434 |
| 4,038,014 | 7/1977 | Dusza et al. | 425/388 |
| 4,063,705 | 12/1977 | Vodra | 425/388 |
| 4,064,659 | 12/1977 | Uliui | 198/345 |
| 4,152,188 | 5/1979 | Friedrich et al. | 156/102 |
| 4,155,583 | 5/1979 | Mikos et al. | 294/65 |
| 4,347,927 | 9/1982 | Landes | 198/434 |

FOREIGN PATENT DOCUMENTS

| | | | |
|---|---|---|---|
| 1936385 | 7/1969 | Fed. Rep. of Germany | 156/102 |
| 52-49570 | 4/1977 | Japan | 414/737 |
| 829586 | 9/1956 | United Kingdom | 156/102 |

Primary Examiner—Edward C. Kimlin
Assistant Examiner—F. K. Wine
Attorney, Agent, or Firm—Edward I. Mates

[57] ABSTRACT

The present invention relates to apparatus for aligning a pair of bent glass sheets of matching configuration for assembly with a position occupied by a flexible sheet of interlayer material to form a sandwich to be laminated.

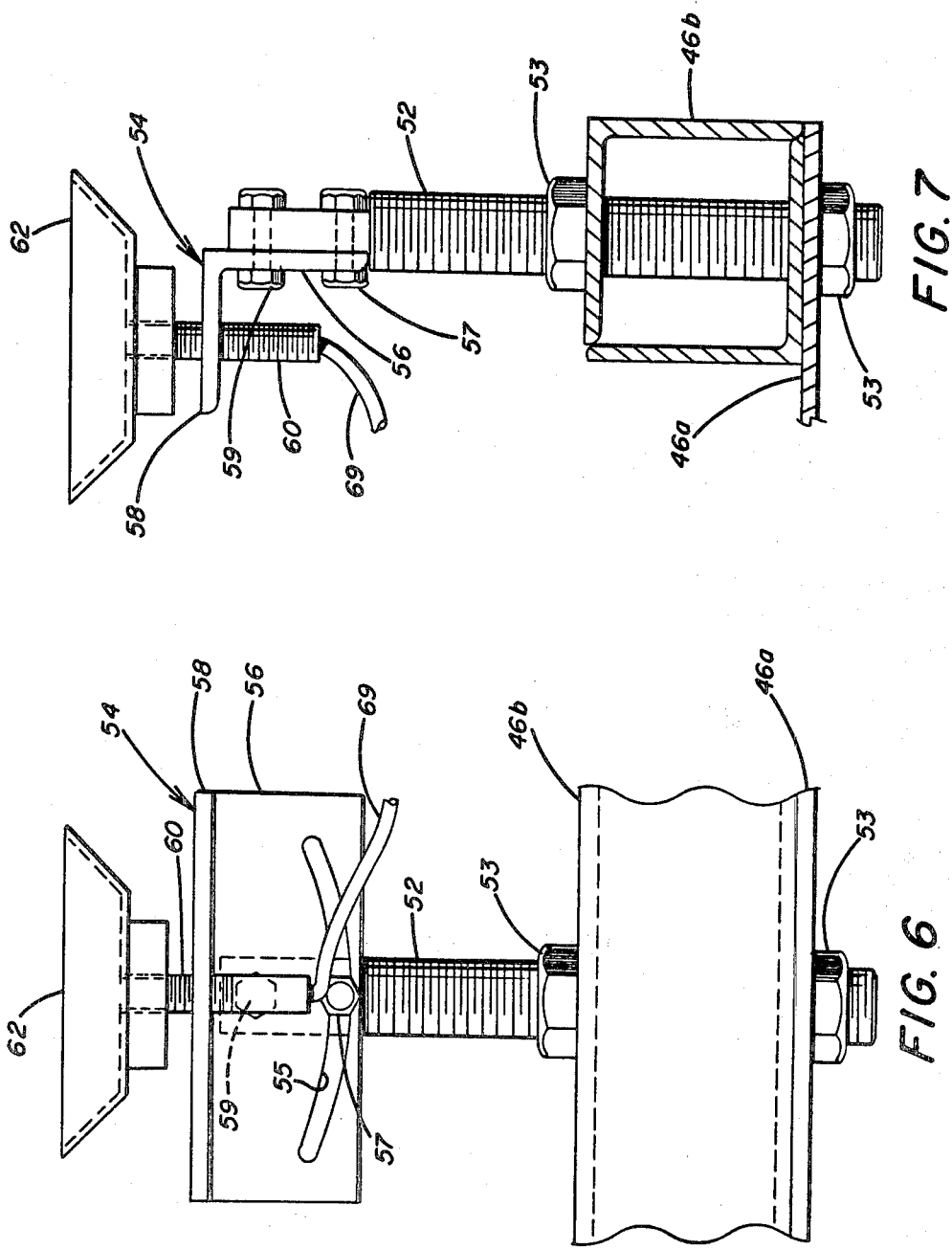

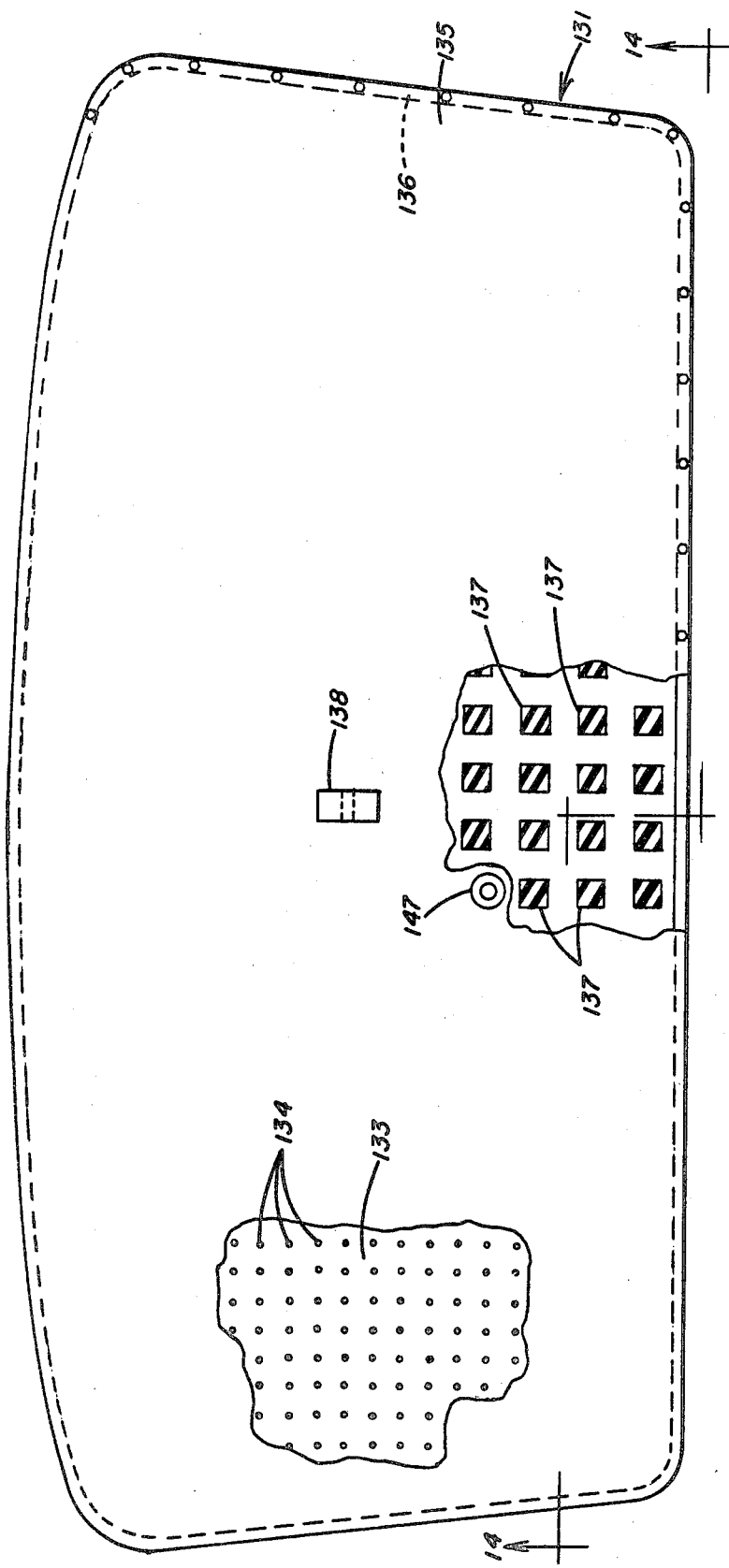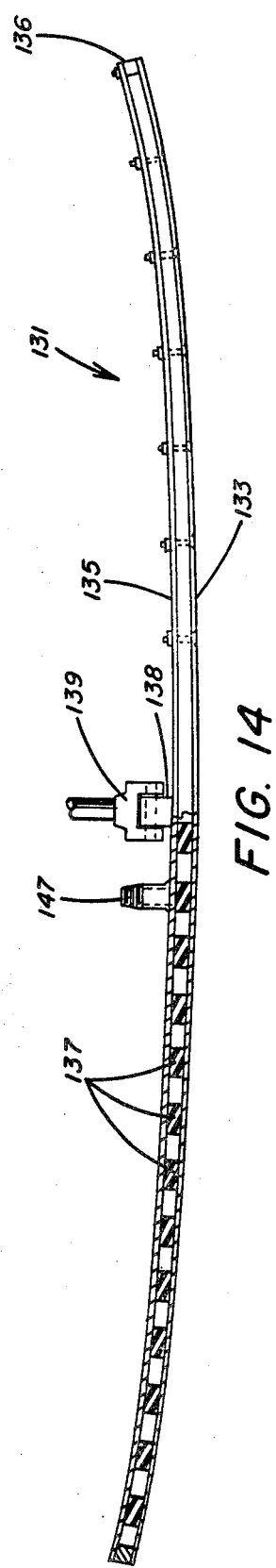

APPARATUS FOR ALIGNING BENT GLASS SHEETS FOR ASSEMBLY INTO BENT GLASS SHEET SANDWICHES

This is a division of application Ser. No. 287,608, filed July 28, 1981, now U.S. Pat. No. 4,367,107.

RELATION TO OTHER APPLICATIONS

The present application is one of several related copending applications that involve inventions incorporated in a method and apparatus for assembling sandwiches comprising a flexible sheet of interlayer material and a pair of bent glass sheets while the latter retain at least a portion of residual heat from their shaping. These applications include:

(1) U.S. patent application Ser. No. 287,595 of James L. Valimont for METHOD AND APPARATUS FOR ASSEMBLING SANDWICHES COMPRISING HOT BENT GLASS SHEETS filed July 28, 1981, now U.S. Pat. No. 4,367,106;

(2) U.S. patent application Ser. No. 287,600, of James L. Valimont and Joseph D. Kelly for ARRANGEMENT OF VACUUM CUPS TO ASSEMBLE ONE OR MORE BENT GLASS SHEETS WITH A SHEET OF FLEXIBLE INTERLAYER MATERIAL filed July 28, 1981, now U.S. Pat. No. 4,368,087;

(3) U.S. patent application Ser. No. 287,607 of James L. Valimont and Hershel L. Phares, for SHAPED MOLD AND A METHOD OF USING SAME TO ASSEMBLE SANDWICH OF A SHEET OF FLEXIBLE INTERLAYER MATERIAL WITH BENT GLASS SHEETS filed July 28, 1981, now U.S. Pat. No. 4,366,013;

(4) U.S. patent application Ser. No. 287,608 of James L. Valimont and Barry L. Shadle for ALIGNING BENT GLASS SHEETS FOR ASSEMBLY INTO BENT GLASS SHEET SANDWICHES filed July 28, 1981, now U.S. Pat. No. 4,367,107.

BACKGROUND OF THE INVENTION

1. Field of the Invention

The present invention relates to the assembly of sheets to be fabricated into bent laminated windshields. Conventionally, bent laminated windshields for automobiles are fabricated using several separate steps. The first step involves bending a doublet, or a pair of glass sheets, into shapes that conform to the shape desired for the bent laminated windshield. The two sheets are bent as a pair so that their shape conforms to one another throughout the entire extent of the glass sheets. A tunnel-like lehr is used to heat the pair of bent glass sheets in unison to conform to the upwardly facing shaping surface of a bending mold.

Usually a parting material is applied to facilitate separating the sheets after the bending operation is completed. A particularly good technique for supplying the parting material involves spraying an aqueous suspension of fine diatomaceous earth in the manner disclosed in U.S. Pat. No. 2,725,320 to Atkeson and Golightly. The benefit of this patented process is that it is unnecessary to wash the parting material from between the interfacial surfaces of the matching bent glass sheets when the bent glass sheets are separated prior to assembling the sheets with a flexible sheet of interlayer material to form a sandwich.

A second step, which conventionally has taken place in an area remote from the glass bending lehr, involves the assembly of the pair of matched bent glass sheets with a flexible sheet of plasticized interlayer material to form the sandwich to be laminated. An interlayer for laminated safety glass windshields for automobiles presently used commercially is composed of a plasticized polyvinyl acetal resin, preferably polyvinyl butyral prepared in the manner recited in U.S. Pat. No. 2,400,957 to Stamatoff.

The polyvinyl butyrals contain a plasticizer. Generally, the plasticizer used is a water-insoluble ester of a polybasic acid and a polyhydric alcohol. Particularly desirable plasticizers for use with the interlayers assembled between pairs of bent glass sheets of matching curvature are triethylene glycol di(2-ethyl butyrate), dibutyl sebacate, di(beta-butoxyethyl) sebacate, dioctyl phthalate, and di-n-hexyl adipate.

Other interlayer materials include certain polyurethanes, preferably those derived by reacting an organic polyisocyanate with a material having a multiplicity of active hydrogen sites, such as a polyether polyol and/or a polyester polyol or a polyamine. U.S. Pat. No. 3,808,077 to Rieser and Chabal discloses polyurethanes suitable for use as the inner layer of bilayer windshields, which comprise an outer glass sheet and an inner layer of polyurethane. These polyurethane compositions are also useful as interlayers in conventional windshields of two glass sheets and an interlayer.

After the sandwich is assembled, it is laminated. In the manufacture of laminated windshields comprising a pair of matched sheets of bent glass and a thermoplastic interlayer, it is desirable to obtain a complete adhesive bond between the glass sheets and the thermoplastic interlayer. This complete adhesive bond is obtained commercially by subjecting the assembled glass and plastic sheets to heat and pressure while immersed in a hot oil bath while within an autoclave. Unless the marginal edges of the laminated assemblies are sealed by bonding the glass to the thermoplastic interlayer before the assembly is exposed to the oil bath, the oil in the autoclave may penetrate between the two sheets of glass and the interlayer. The assembly being laminated is discolored in the portion where oil penetration takes place.

In preparing assemblies for the autoclave, two bent glass sheets and a plastic interlayer are assembled in the form of a sandwich in an area remote from the bending lehr. The bent glass sheets are usually cooled to a temperature approaching room temperature during their transfer to an assembly area. Therefore, they form a cool sandwich of sheets that are able to slide relative to one another. To avoid sliding, the sandwich must be heated to a temperature at which the interlayer becomes tacky and resists relative sliding.

The heated sandwich is subjected to a preliminary pressing by passing the sandwich between one or more pairs of nipper rolls formed of resilient, yet frictional, contacting material that engage the outer surfaces of the assembly to be laminated. As the sandwich passes through the nipper rolls, air entrapped between the layers of the assembly is forced out. This preliminary pressing, sometimes followed by edge rolling of the margin of the plastic interlayer before the latter cools to room temperature, provides a sufficient seal extending over the entire marginal area of the assembly to prevent oil penetration and the resulting discoloration when the assembly is subjected to its final pressing operation in the oil autoclave. A typical roll pressing apparatus for prepressing glass-plastic sandwiches is disclosed in U.S. Pat. No. 3,351,001 to Achkio.

At times, some portion of the plastic sheet adjacent the edge of the laminate is not sealed to the glass after the prepressing operation, so that in the final pressing operation oil can enter the laminate. To alleviate this condition, any portions of the edge that are not sealed after prepressing are manually edge sealed to prevent the oil from entering the laminate during the final pressing operation. This edge sealing is accomplished immediately after prepressing by rolling and compressing the hot interlayer edge, so as to force it between the glass sheets into sealing contact therewith, with a thin metal disc known in the trade as an edge roller. A preferred edge roller is described in U.S. Pat. No. 2,999,779 to Morris.

The usual autoclave treatment utilizes temperatures ranging from about 190° to 325° F. (88° to 163° C.) preferably about 225° to 300° F. (107° to 149° C.) and, simultaneously, elevated pressure in the range of 100 to 250 pounds per square inch (0.7 to 1.7 megapascals) and preferably 175 to 225 pounds per square inch (1.2 to 1.5 megapascals) for a period of ten minutes to more than one hour, preferably 20 to 45 minutes. While oil autoclaves have been used more frequently in the past, final lamination has been accomplished by immersing prepressed assemblies in air autoclaves at approximately the same temperature and pressure conditions as those that prevail in oil autoclaves.

In the past, glass sheets were bent in pairs at one part of a windshield fabrication plant and assembled, prepressed, edge rolled and subjected to autoclave conditions in other parts of the plant. When sandwiches are assembled manually, it is convenient to allow the bent glass sheets to cool to a temperature suitable for handling before performing the sandwich assembly step. Such cooling wastes the residual heat in the bent glass sheets. It would be desirable for the assembly of the sandwich to take place at a time and place such that the energy presently lost through cooling the glass sheets between the bending operation and the assembly of the sandwich is not wasted so that the sandwich can be assembled, prepressed and edge-rolled using as much of the residual heat from the bending operation as possible. If the sandwich assembly is performed automatically there is no need to be concerned with operator discomfort that relates to handling hot glass sheets.

It would be desirable to perform the sandwich assembly step automatically rather than manually to provide a more consistent alignment of the sheets comprising the sandwich prior to their assembly while hot than is possible from assembling the sandwich by hand. When a flexible sheet of interlayer material is assembled between a pair of bent glass sheets at an elevated temperature at which the interlayer surfaces become tacky on contact with hot glass and is unable to slide relative to the hot glass it contacts, the sandwich remains in its originally assembled configuration during subsequent treatment steps incuding the prepressing operation using pressing rolls. Since automatic assembly provides more repetitive alignment than manual assembly, the chance of breakage due to misalignment of the bent glass sheets of the sandwich during roll pressing required for prepressing is minimized provided automatic assembly apparatus is provided with means to align the assembly position of the flexible sheet of interlayer material with those of the two bent glass sheets.

For the sake of this description, the term "bent glass sheet pair" refers to a pair of bent glass sheets without an interlayer sheet, the term "subassembly" is used to identify a partial sandwich of a single glass sheet and an interlayer sheet, the term "sandwich" comprises two matched bent glass sheets and a flexible sheet of interlayer material, the term "assembly" is applied to a sandwich that has been prepressed and is ready for final lamination, and the terms "laminate" and "laminated windshield" are applied to the finally laminated assembly after the latter is subjected to an autoclave operation.

2. Description of Patents of Interest

U.S. Pat. No. 2,920,989 to Cochran et al describes an automatic assembly apparatus for assembling a pair of bent glass sheets to form a sandwich of the glass sheets with a sheet of interlayer material. The bent glass sheets are separated and move at equal velocities along an assembly line where a sheet of interlayer material is applied to the upper surface of the lower bent glass sheet and the upper glass sheet is then pivoted onto the upper surface of the interlayer to assemble a sandwich for lamination. This operation is performed in an area remote from the location where the glass is bent. Consequently, the glass retains little, if any, residual heat from bending to assist in assembling the sandwich. Therefore, the sandwich must be reheated for the prepressing and edge rolling steps.

U.S. Pat. No. 2,205,003 to Walters describes an apparatus for assembling a sandwich of two flat glass sheets and a sheet of interlayer material. The glass sheets are of rectangular outline and are mounted on tables pivotable between a horizontal and a vertical orientation. After the glass sheets are mounted in the horizontal orientation, the tables are pivoted upon pivot axes located at the adjacent ends of the table, a sheet of interlayer material is inserted therebetween and the assembly is formed in a vertical orientation. The assembled sheets are then pivoted in unison beyond the vertical orientation so that the assembly can then be removed. This patent does not treat bent assemblies nor does it treat assemblies in which any of the components remain heated from a previous operating step.

U.S. Pat. No. 3,499,744 to Tolliver suggests using residual heat in recently bent glass sheets to help secure a small metal bracket that supports a rear view mirror to a glass surface. The metal bracket is coated with a thermoplastic adhesive on the surface bonded.

U.S. Pat. No. 3,518,137 to Hamilton discloses apparatus for assembling a safety glass panel, also of flat safety glass, and provides a wedge means that moves in advance of a pair of nipper rolls to insure that air is selectively removed from the interfacial surfaces of the assembly during its fabrication. While the patent refers to the application of heat and pressure when an interlayer is self-securing at elevated temperatures, there is no suggestion in this patent of using the heat remaining from a previous operation, such as shaping the glass sheets, to help bond adjacent layers of an assembled sandwich to one another.

Since a specific embodiment of the present invention involves the use of vacuum supports, a novelty search reported U.S. Pat. No. 2,317,348 to Wekeman, which discloses a vacuum holder in which sheets are supported by vacuum around their perimeter. Another patent cited was U.S. Pat. No. 3,833,251 to Creskoff, which discloses a vacuum lifter to support arcuately shaped objects. The lifter is provided with a pair of flexible sheets, one of which is reinforced with a central stiffening member that helps prevent undesired bending of a flexible sheet having a port through which a vacuum source communicates to provide the vacuum for lifting objects of arcuate shape. Another vacuum suspension device for handling large sized plates is reported in U.S. Pat. No. 4,155,583 to Mikos et al. The apparatus of this patent comprises a vacuum chamber divided into two parts, a larger work chamber forming a vacuum container connected with pumps and a smaller decompression chamber situated below the working chamber. Both chambers are connected together by electromagnetic valves to provide a quicker operation. This vacuum suspension apparatus is particularly useful in handling concrete building parts that are of low strength and brittle.

U.S. Pat. No. 3,638,564 to Prange et al. discloses means to orient and align a flat glass sheet of non-rectangular outline on a conveyor belt. This patent provides side edge engaging discs movable in pairs to engage the opposite side edges of the glass sheet and end edge engaging discs that move in pairs against the opposite end edges of the flat glass sheets in a horizontal plane common to the discs to properly align each sheet both transversely and longitudinally of the conveyor belt at a fixed station.

SUMMARY OF THE INVENTION

The present inventon is preferably performed using apparatus concerned with the assembly of a sandwich with minimum fuel consumption to insure that the flexible sheet of interlayer material tacks onto both bent glass sheets. It also concerns assuring that the sheets comprising the sandwich are aligned precisely to minimize the possibility of breakage during further processing and to insure that a laminated windshield having good optical properties results.

The illustrative embodiment of the present invention involves apparatus for aligning bent glass sheets preparatory to automatically assembling a pair of bent glass sheets of matching curvature with a flexible sheet of plastic interlayer material to form a sandwich to be laminated in such a manner that the residual heat resulting from the glass sheet bending operation is not completely wasted. The bent glass sheets and the sheet of interlayer material are assembled automatically to form a sandwich for the prepressing operation and the edge rolling operation (should the latter be needed) in the vicinity of the exit of a glass sheet bending lehr where the glass sheets are bent in pairs to assemble a sandwich of a flexible sheet of interlayer material with a pair of bent glass sheets while hot.

Various specific features of the specific embodiment of an assembly method and apparatus are covered either in the present application or in closely related copending patent applications. These include the invention of James L. Valimont and Hershel L. Phares described and claimed in U.S. patent application Ser. No. 287,607 that covers the manner in which the flexible interlayer sheets are handled prior to sandwiching one of them between a pair of bent glass sheets of matching configuration at a sandwich assembly station.

In this specific embodiment, the flexible interlayer sheet is mounted in proper alignment over a curved vacuum mold, such as is described and claimed in the aforesaid copending patent application Ser. No. 287,607, having an apertured wall shaped to conform to the shape of the bent glass sheets while the shaped wall is oriented to a convex elevation. The vacuum mold is then rotated 180 degrees with vacuum applied to hold the sheet of flexible interlayer material in a concave elevational configuration against the mold. The bent glass sheets oriented to have a concave elevation are separated to provide a gap for inserting the sheet of the interlayer material between the bent glass so that the vacuum mold moves into a position where its shaped apertured wall is between the separated bent glass sheets and then is moved toward the lower bent glass sheet to deposit the sheet of interlayer material in proper alignment over the lower glass sheet.

The vacuum mold is then pressurized to help transfer the interlayer sheet as quickly as possible onto the lower bent glass sheet to form a subassembly. The vacuum mold is removed from the assembly station as soon as the subassembly of the lower glass sheet and sheet of interlayer material is formed.

The upper bent glass sheet then moves into a position of alignment with the subassembly to engage the interlayer sheet to complete the sandwich while still hot enough to make the interlayer sheet tacky on contact as taught by the invention of James L. Valimont described and claimed in U.S. patent application Ser. No. 287,595. The vacuum mold is rotated to a convex elevational configuration to one side of the assembly station to load another flexible sheet of interlayer material for use in the next sandwich to be assembled.

The assembled sandwich leaves the assembly station for a further processing station, which, in this case, is a roll pressing station. To insure against mismatch of the flexible interlayer sheet relative to the vacuum mold and also to compensate for dimensional changes in the sheet of flexible interlayer material, the latter sheets are preferably cut to slightly larger dimensions than the bent glass sheets forming the sandwich or subassembly to be assembled.

Another feature of the specific embodiment of apparatus covered in one of the closely related applications involves the use of a plurality of vacuum cups for supporting the bent glass sheets. The vacuum cups are mounted and oriented in a lower set and an upper set. The cups in each set move in unison so that the lower set engages the bottom surface of the lower bent glass sheet in flatwise engagement against localized engaged areas and the upper set engages the top surface of the upper bent glass sheet in a similar flatwise engagement. When vacuum is applied to the vacuum cups and the sets are separated, they separate the two glass sheets to provide a clearance gap for moving a sheet of flexible interlayer material into the assembly position within the gap while the flexible sheet is engaged by vacuum by a vacuum mold having an apertured sheet engaging wall shaped to conform to the bent glass sheets.

In a specific embodiment of this feature of inventive subject matter, each set of vacuum cups is mounted along a surface generally parallel to the surface defined by the engaged bent glass sheets. According to the invention described and claimed in the aforesaid copending patent application Ser. No. 287,600, the lower set of vacuum cups includes at least one upwardly biased, central vacuum cup that engages the central portion of the lower glass sheet to provide a slight, temporary upward bias to the central portion of the lower glass sheet when the lower set initially engages the bottom surface of the lower glass sheet. Thus, when the vacuum mold is lowered to apply the flexible interlayer sheet against the top surface of the lower bent glass sheet, the interlayer initially makes contact with the slightly upwardly biased central portion of the lower bent glass sheet, the lowering mold gradually overcomes the upward bias of the central portion and gradually increases the area of contact outward from the central portion of original contact with the lower bent glass sheet toward the outermost longitudinal ends of the glass sheet to force air along the interface toward the edge of the resulting subassembly. Removing the vacuum mold reinstitutes the temporary upward bias in the central portion of the lower glass sheet, so that when the upper glass sheet is installed in superimposed position over the subassembly comprising the biased bottom glass sheet and the interlayer sheet, the bottom surface of the upper glass sheet makes initial contact with the top surface of the interlayer sheet at its central portion superimposed on the temporarily upwardly biased central portion of the lower glass sheet and the upward bias is gradually overcome as the upper glass sheet is lowered. In this manner, the area of contact gradually increases outward from the central portion between the bottom surface of upper bent glass sheet and the top surface of the interlayer sheet toward the opposite longitudinal ends of the sheets to force air along the newly formed interface toward the edges of the resulting sandwich. This aspect of inventive subject matter is believed to cover the assembly of the subassembly as well as that of the sandwich.

Another feature of the preferred embodiment to be covered in said patent application Ser. No. 287,607 of James L. Valimont and Hershel L. Phares involves a lightweight vacuum mold having an apertured wall shaped to conform to the top surface of the lower glass sheet, a second wall of similar shape and a plurality of relatively closely spaced blocks of uniform thickness separating the shaped walls to insure that the walls of the vacuum mold remain uniformly spaced from one another, while providing a vacuum mold of minimum mass and desired shape. The lightweight vacuum mold moves between an orientation of convex elevational configuration for applying the flexible interlayer sheet onto the mold at a mold loading station and an orientation of concave elevational configuration at an assembly position aligned with positions of alignment for at least one of the bent glass sheets at an assembly station.

Still another feature of inventive subject matter contained in the preferred apparatus embodiment involves means to insure the alignment of the top and bottom bent glass sheets before they are separated from one another to an alignment position that the flexible sheet of interlayer material occupies at the assembly station, and to insure that they are in proper alignment while the sandwich is assembled. The alignment means is described and claimed in the present patent application and comprises longitudinal end edge alignment means, side edge alignment means and two sets of vacuum cups. The end edge alignment means comprises a pair of linear rotating rolls to engage each longitudinal end edge of the glass sheet pair, means to orient each of said pairs of linear rotating rolls to be parallel to an adjacent end edge portion of the glass sheets, and means to move said pairs of linear rotating rolls in essentially horizontal paths spaced vertically from the support plane of the conveyor.

The linear rotating rolls of the end edge alignment means are freely rotatable about axles that extend obliquely in directions approximately parallel to the end edge surfaces of bent sheet pairs having a curvature about a transverse axis within a given range of curvatures. The oriented pairs of linear rotating rolls have an axial length sufficient to engage spaced end edge portions of pairs of bent glass sheets having a depth of bend within a given range of depths of bend when moved in unison along said essentially horizontal paths.

The side edge alignment means comprise a pair of side edge alignment rolls adapted to engage each side edge of said glass sheet pair by moving at least one of said pair of side edge engaging rolls and preferably both of said pairs of side edge engaging rolls transversely to define a transverse alignment position of support along the conveyor. Then, the side edge engaging rolls move vertically while maintaining side edge engagement as the pair of bent glass sheets is lifted off the position of support along the conveyor.

The linear rotating rolls of the end engaging means are oriented in pairs of freely rotatable end edge engaging rolls. Each roll pair is mounted to pivot for pivotable adjustment to a desired fixed orientation about a common axis for the roll pair to position said linear rotating rolls along a line parallel to the longitudinal end edge of the bent glass sheet pair adjacent thereto. Each linear rotating roll is freely rotatable about an obliquely extending axis approximately parallel to the corresponding end edge of the bent glass sheets of a family of patterns to be aligned and assembled into sandwiches. The rolls of the edge alignment means orient and align the bent glass sheet pair as a pair relative to the support provided by spaced conveyor rolls prior to the engagement of the upper and lower bent glass sheets by upper and lower sets of vacuum cups that engage the upper and lower glass sheets of the pair after the lower set lifts the bent glass sheets off the conveyor support. The vacuum cups maintain the orientation and alignment of the bent glass sheets relative to an assembly station after the edge alignment rolls are separated from the engaged edges.

The gist of the present invention relates to aligning bent glass sheets relative to a position occupied by a flexible interlayer sheet for assembly into a sandwich comprising a pair of bent glass sheets and said interlayer sheet. The present invention is one of several improvement inventions that are incorporated in the best mode to perform the invention described and claimed in copending U.S. patent application Ser. No. 287,595 of James L. Valimont.

The benefits of the assembly apparatus and the features claimed in this case will be appreciated in the light of a description of a preferred embodiment that incorporates the claimed features that follows.

BRIEF DESCRIPTION OF THE DRAWINGS

In the drawings that form part of the description of the preferred embodiment, and wherein like reference numbers are used to depict like structural elements.

FIG. 6 is an enlarged detailed view of a lower end vacuum cup and its supporting structure showing how the vacuum cup can be adjusted and tilted;

FIG. 7 is a view taken at right angles to the view of FIG. 6;

FIG. 13 is a plan view of a vacuum mold having a curved apertured wall conforming to the shape of the bent glass sheets, with parts of one wall broken away to show parts of an apertured wall and the arrangement of certain spacer elements that are distributed throughout the vacuum mold;

FIG. 14 is a partial cross-section and partial side elevation taken along the line 14—14 of FIG. 13.

DESCRIPTION OF THE PREFERRED EMBODIMENT

Figure 1:
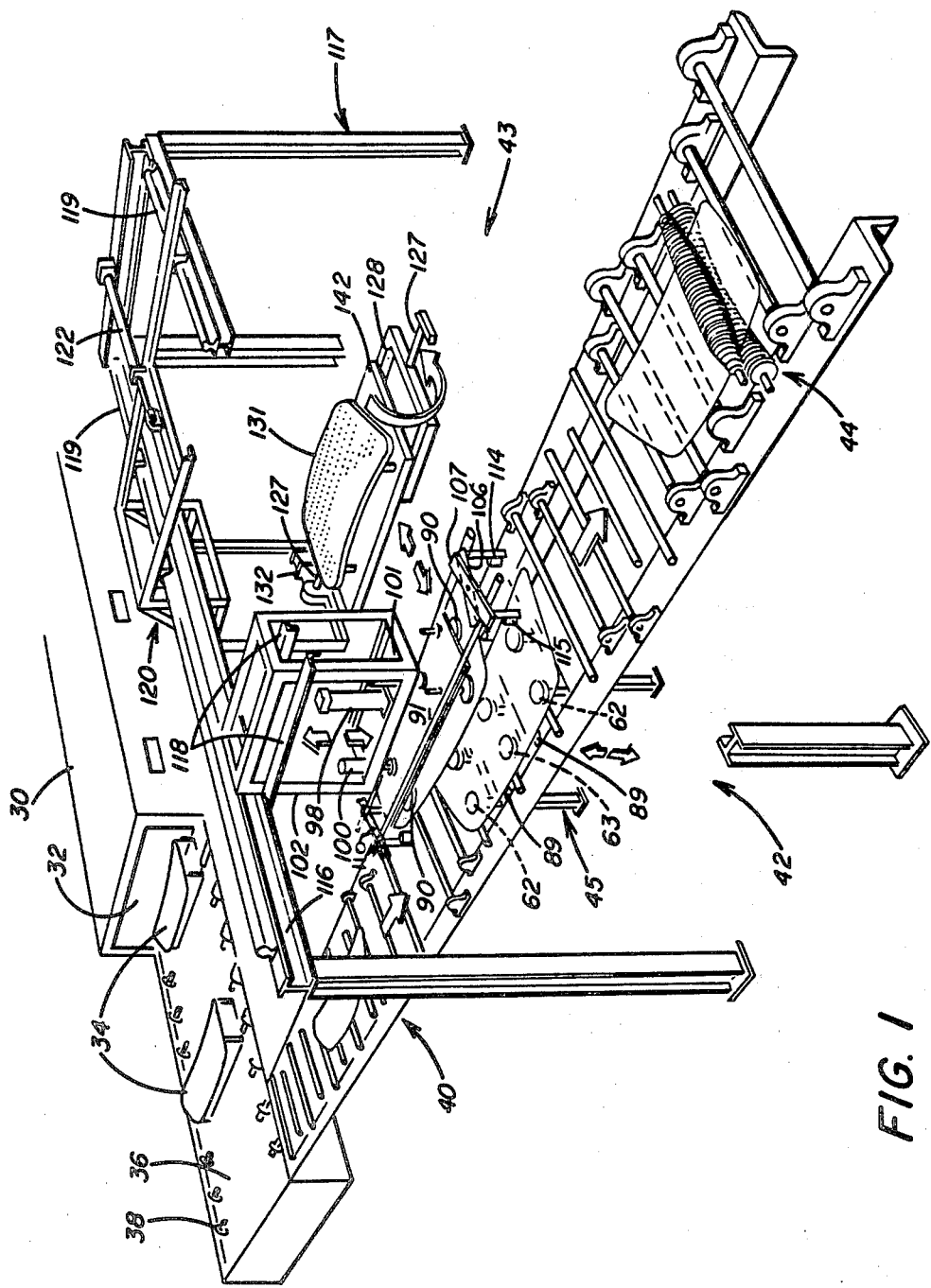
FIG. 1 is an isometric, schematic view of a station for assembling a sandwich of a flexible plastic interlayer (not shown) between a pair of bent glass sheets, shown separated, showing how the assembly station is located in close relation to a glass sheet bending lehr with a cross conveyor for conveying bent glass sheets from said bending lehr into said assembly station and in close relation to a vacuum mold loading station for applying a sheet of flexible interlayer material thereon for transfer to the assembly station while supported on the mold, with certain parts omitted to show other parts more clearly.

The various inventions incorporated in this specification will be better understood in the light of a description of a preferred embodiment which follows. In the preferred embodiment, the apparatus of the present invention is shown in an environment in which it is used to assemble a sandwich of a bent glass sheet pair including an upper bent glass sheet 11 and a lower bent glass sheet 12 with a flexible sheet 14 of interlayer material assembled in unwrinkled relation therebetween.

The sheets used to form the sandwich have similar outlines. Since the interlayer material shrinks and expands diffentially during thermal treatment required for lamination to glass sheets, it is preferred to cut the flexible sheets 14 of interlayer material to outline shapes having slightly larger dimensions that those of the bent glass sheets 11 and 12. The flexible sheets 14 are preferably made approximately $\frac{3}{8}$ inch (10 millimeters) longer and $\frac{1}{4}$ inch (6 millimeters) wider than the corresponding dimensions of the bent glass sheets 11 and 12 to provide a border of flexible interlayer material extending about 3/16 inch (5 millimeters) beyond each longitudinal end and about $\frac{1}{8}$ inch (3 millimeters) beyond each transverse side of the glass sheets between which they are assembled.

As best seen in FIG. 1, the environment comprises a bending lehr 30 of tunnel-like configuration having a lehr exit 32. A plurality of bending molds and carriage assemblies 34 transverse the bending lehr 30 and pass the lehr exit 32 onto a glass sheet unloading station 36 to which they are conveyed by a plurality of lehr conveyor rolls 38. The bending lehr is typical of the prior art.

Immediately to one side of the unloading station 36, the upstream end of a cross conveyor 40 is located. The cross conveyor 40 extends from its upstream end adjacent the unloading station 36 along a path over a short distance slightly longer than the longest of glass sheets to be processed and intersects an assembly station 42 to one side of which is located a vacuum mold loading station 43. The cross conveyor continues along a continuation of said path through a roll pressing apparatus 44 and beyond to an unloading station (not shown).

The assembly station 42 of the present invention comprises a support frame 45 (FIG. 2) adjustably supporting an open-sided table 46 for vertical movement. Table 46 comprises a horizontal plate 46a and a box-like frame 46b. The latter is provided with vertical guide rods 47 that slide in collars 48 (fixed to the support frame 45) to guide the table for vertical movement. A piston rod 49 extending upwardly from a vertically oriented piston cylinder 50 is connected to the horizontal plate 46a to move the table 46 vertically between a lower position below cross conveyor 40 and an upper position. The cylinder is rigidly mounted on a bracket 51 that is rigidly supported on the support frame 45.

A plurality of externally threaded vertical rods 52 (FIGS. 2, 3, 6 and 7) are adjustably attached to the table 46 by extending through aligned openings in the horizontal plate 46a and the box-like frame 46b and secured thereto by lock nuts 53. Each vertical rod 52 is attached to an angle member 54 at its upper end. Each angle member 54 comprises an arcuately slotted and apertured vertical flange 56, whose arcuate slot is indicated at 55, and a horizontal flange 58. A lower radial bolt 57 is fixed to the vertical rod 52 and extends through the arcuate slot of the arcuately slotted flange 56. An upper radial bolt 59 is fixed to the vertical rod 52 and extends parallel to the direction of the lower radial bolt 57 through an upper aperture of the slotted and aperture flange 56. Tightening nuts are provided to secure the lower radial bolt 57 in a desired position along the arcuate slot in the arcuately slotted flange 56 and to secure the upper radial bolt 59 in the aperture of flange 56. The angle members 54 are free to pivot about axes defined by the upper radial bolts 59 as limited by the length of the arcuate slots 55 when the bolts 57 and 59 are unsecured.

An externally threaded drilled out rod 60 is fixed to the horizontal flange 58 of each angle member 54. An end lower vacuum cup 62 is fixed to the upper end of the drilled out rod 60. In this manner, both the vertical position and the orientation of the end vacuum cups 62 can be adjusted so that the mean plane of the vacuum cup is parallel to the tangent of the bottom surface of the lower bent glass sheet 12 in the vicinity of the associated end lower vacuum cup 62. The orientation of each end vacuum cup is changed by loosening the arcuate slot connection and repositioning the bolts to another position along the arcuate slot and tightening the bolts of the corresponding angle member 54.

The vacuum cups are made of rubber and a preferred size is 4 inches (10 centimeters) in diameter. A preferred durometer for the vacuum cups is 45 Shore A. The end vacuum cups 62 are arranged in transversely aligned pairs located to engage a shaped glass sheet near each of its opposite longitudinal ends in transversely spaced areas.

An additional pair of lower central vacuum cups 63 similar in construction to the end vacuum cups 62 are also mounted to the upper ends of additional drilled out rods 60, which are mounted on additional angle members 54, which are disposed toward the center of the box-like frame 46b. Vacuum cups 62 and 63 serve as a lower set of flexible support members comprising a pair of transversely spaced end lower vacuum cups 62 at each end portion of an assembly area and a pair of transversely spaced central lower vacuum cups 63 at the central portion of the assembly area. The lower set of vacuum cups are located generally along a surface conforming to the shape of the bent glass sheets except for a slight upward biasing of the central lower vacuum cups 63. The lower set of vacuum cups 62 and 63 serve as a first set of flexible support members.

Figure 8:
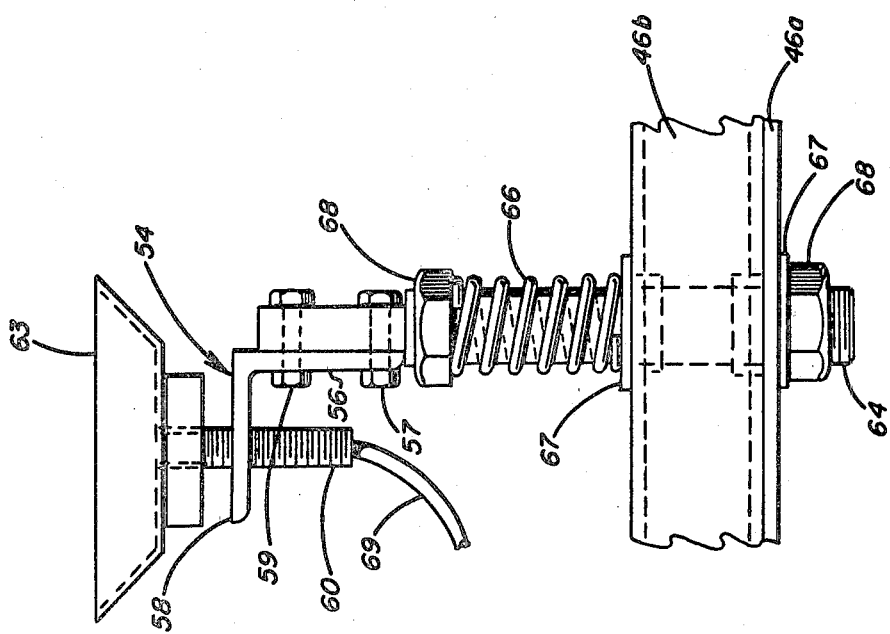
FIG. 8 is an enlarged detailed view of a lower middle vacuum cup showing a spring loaded connection to its support structure.

The middle angle members 54 are arcuately adjustable relative to a vertical rod 64 (FIG. 8), which is mounted in spring-loaded relation to the table 46 through a compression spring 66, which bears against a bushing 67 at its lower end and an upper of a pair of spring adjustment nuts 68 at its upper end. The vertical rods 64 extend through aligned openings in the central portions of box-like frame 46b and plate 46a and are locked at their lower ends to the table 46 by lower bushings 67 and lock nuts 68.

The spring 66 is so constructed and the vertical position of the vertical rod 64 is adjusted relative to the positions of adjustment of the end lower vacuums cups 62 that the middle lower vacuum cups 63 would occupy positions along a curved surface occupied by said end lower vacuum cups that is generally parallel to the shape of the lower bent glass sheet 12 except when springs 66 provide an upward bias to the middle lower vacuum cups 63 that bias the latter upwardly from the generally parallel surface for reasons to be explained later.

A flexible vacuum hose 69 is attached to each drilled-out rod 60 to provide a path to a source of vacuum (not shown). The hose 69 is also provided with a valved connection to transfer the path of communication with a vacuum source to one communicating with a source of pressurized air (not shown).

The vacuum cups 62 and 63 are located in space between adjacent conveyor rolls of the cross conveyor 40. This permits the lower set of vacuum cups 62 and 63 to move vertically in unison through the discontinuous plane of support provided by the rolls of cross conveyor 40 while maintaining their relative alignment and individual orientation on actuation of the piston rod 49 in vertically oriented piston cylinder 50. The upper and lower vertical positions of the piston rod are carefully controlled so that the lower set of vacuum cups 62 and 63 is below the level of cross conveyor 40 when the piston rod 49 is retracted, its uppermost position is defined by the height needed to lift the pair of bent glass sheet to enable the top surface of the upper glass sheet 11 to engage an upper set of vacuum cups at the upper position while the lower set of vacuum cups supports the lower bent glass sheet at a position where a flexible sheet of interlayer material is applied thereto at the assembly station 42.

Figure 5:
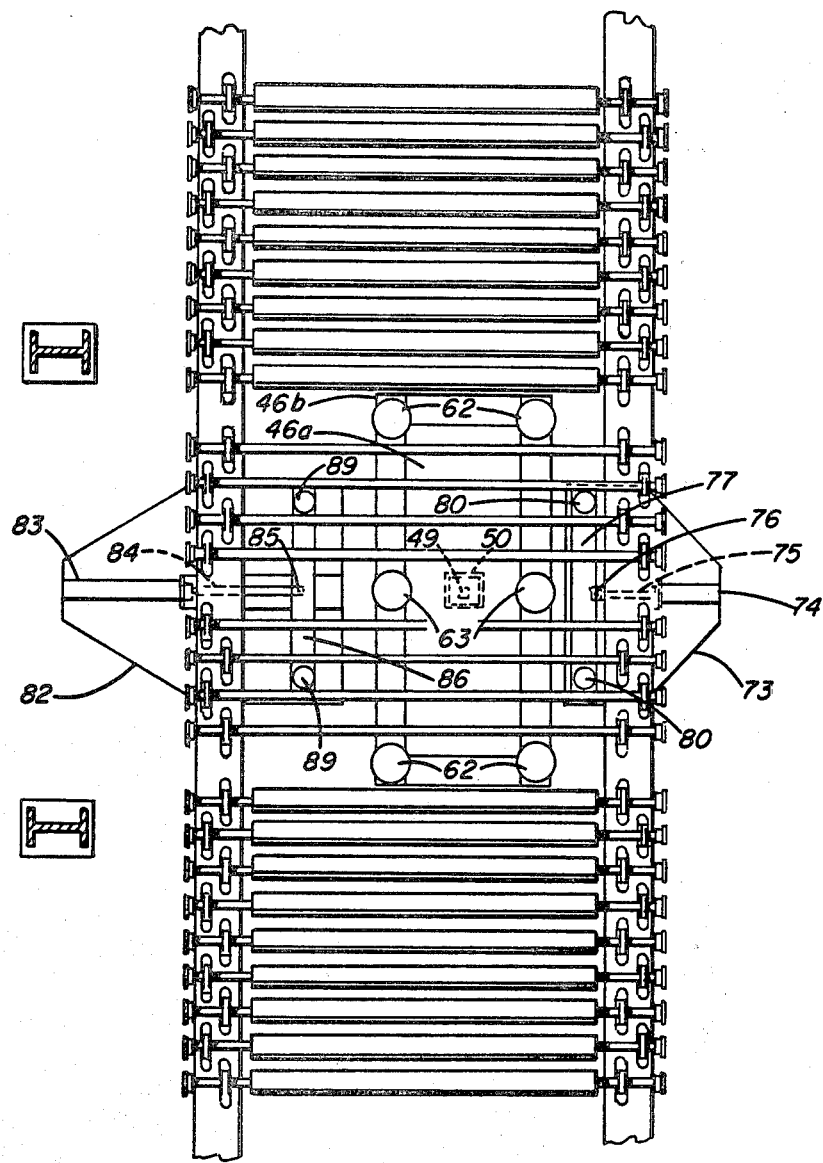
FIG. 5 is a horizontal sectional view of the lower portion of the assembly station taken along the line 5—5 of FIG. 2.

The cross conveyor 40 is supported on a conveyor support structure 70 (FIG. 3) having a plurality of vertical columns 71 and 72 along each side of the cross conveyor. The vertical columns support bearing housings for horizontally disposed conveyor rolls in a manner well known in the art. The conveyor rolls are arranged in sections to move in a controlled sequence in a manner well known in the conveyor art. A pair of adjacent vertical columns 71 also supports a bracket 73 on which is mounted a first horizontal cylinder 74 from which a piston rod 75 extends. A clevis 76 (see FIG. 5) is attached to the outer end of the piston rod 75, and in turn is attached to the middle of a cross arm 77. The ends of the cross arm 77 are mounted in horizontal guides (not shown) to insure that the cross arm 77 moves in a horizontal direction on actuation by piston rod 75. A pair of vertical guide rods 78 (FIG. 3) extend upward from the cross arm, one on each side of the clevis. Each guide rod 78 has a reduced, elongated upper portion 79 that receives a freely rotatable and vertically slidable linear guide roll 80 for engaging one side edge of a glass sheet during an assembly operation. This engaged side becomes the bottom side edge of the installed windshield. The guide rolls 80 will be referred to as the bottom side edge alignment rolls.

Mounted in similar manner to bracket 73, a pair of adjacent vertical columns 72 supports a bracket 82. A second horizontal cylinder 83 (opposed to cylinder 74) containing a piston rod 86 (similar to piston rod 75) is mounted thereon. A clevis 85 is attached to piston rod 84 at the middle of a cross arm 86, similar to the attachment of clevis 76 to piston rod 75 at the middle of cross arm 77. A pair of vertical guide rods 87 similar to vertical guide rods 78 with reduced upper portions 88 (similar to reduced upper portions 79) support guide rolls 89 in a manner similar to the support of guide rolls 80. Guide rolls 89 are called the top side edge alignment rolls because they engage the side edge of the glass that becomes the top side edge of the installed windshield. Guide rolls 80 and 89 are preferably composed of a material that does not harm glass such as soft rubber. A Shore A durometer of 50 to 55 is suitable for the side edge guide rolls 80 and 89.

Piston rods 75 and 84 move the pairs of side edge guide rolls 80 and 89 between laterally recessed positions and controlled glass side edge engaging positions against the opposite side edges of the bent glass sheet pair or of the lower bent glass sheet 12 to align the glass sheets transversely of one another and on opposite sides of a vertically extending space that intersects a desired assembly position within the assembly station. The free vertical sliding of guide rolls 80 and 89 along the reduced upper portions 78 and 87 of the guide rods 78 and 87 maintains the glass sheets in transverse alignment within said vertically extending space as long as the guide rolls 80 and 89 engage the side edges of the glass sheets. The free vertical sliding arrangement permits the side edge engaging guide rolls 80 and 89 to fall by gravity to positions defined by the wider, lower portions of the guide rods 78 and 87, which serve as stops. The latter enable the side edge alignment rolls 80 and 89 to intersect the horizontal plane of support provided by the rolls of the cross conveyor 40 when the side edge engaging rolls 80 and 89 are laterally retracted and slid down on the vertical guide rods 78 and 87.

Two pairs of upper vacuum cups 90 are adjustably mounted relative to an apertured plate 91 for adjustment along axes exending obliquely of the plate. The upper vacuum cups 90 are located near the opposite longitudinal ends of the vertically extending space that a pair of bent glass sheets occupies during an assembly operation, and need not oppose the lower vacuum cups 62 or 63. The upper vacuum cups 90 serve as an upper or second set of flexible support members and are oriented to face a curved surface parallel to the curved surfaces defined by the pair of bent glass sheets and also parallel to the curved surface defined by the end lower vacuum cups 62 and the middle lower vacuum cups 63 when the latter are not biased upwardly.

Figure 9:
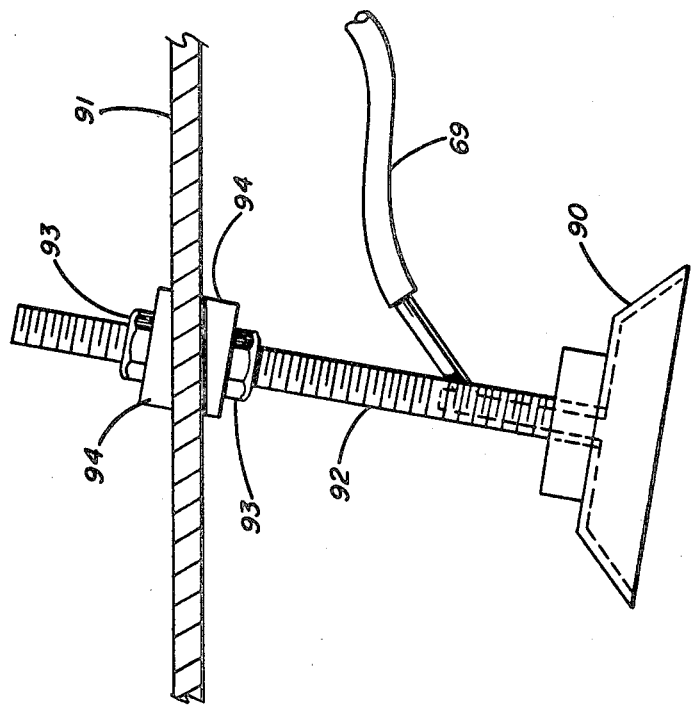
FIG. 9 is an enlarged detailed view of one of the upper vacuum cups showing how it is mounted along an oblique axis relative to an upper vacuum cup support means.

As seen in FIG. 9, the mounting for each vacuum cup 90 comprises a threaded shaft 92 that is drilled axially for at least a portion of its length to provide an evacuation or pressurized air supply passage, a pair of lock nuts 93 disposed on opposite sides of apertured plate 91 and a pair of bevelled washers 94 having complementary bevels disposed on either side of the apertured plate 91 in position to receive the drilled threaded shaft 92 that extends through an aperture of the apertured plate 91. A vacuum hose 69 communicates with the drilled portion of the threaded shaft 92 to communicate each upper vacuum cup 90 with a vacuum source or a source of pressurized air through suitable valve means (not shown).

The upper vacuum cups 90 may be made of the same size, material and construction as the lower vacuum cups 62 and 63. Turning the complementary bevelled washers 94 about the axis of shaft 92 enables one to orient the plane of each upper vacuum cup 90 to bring the associated cup in flatwise relation relative to the tangent to the top surface of the upper bent glass sheet 11 in the area of engagement.

The orientation of the upper vacuum cups 90 may also be changed when required to conform to different glass sheet shapes by disassembling the threaded shafts 92 from the apertured support plate 91, removing the set of bevelled washers 94 and reassembling the threaded shafts 92 to the apertured plate with complementary bevelled washers having a different bevel from those removed. Using either method, the orientation of the upper vacuum cups 90 is arranged to have the vacuum cups 90 parallel to the mean datum plane of the bent glass sheet in the portion of the top surface of the upper glass sheet that it engages and to have the upper set of vacuum cups 90 supported generally along a curved surface parallel to the contour of the bent glass sheets 11 and 12.

A pair of shaft rail supports 95 is connected to the upper side of plate 91, as seen in FIGS. 2, 3, 10, 11 and 12. Each shaft rail support 95 supports a longitudinal rail 96, described as longitudinal as it extends longitudinally of the path defined by the cross conveyor 40.

A clevis 97 attaches the upper surface of apertured plate 91 to the lower end of a vertically extending piston rod that moves relative to a vertical piston cylinder 98. Three vertical guide rods 99 also extend vertically upward from apertured plate 91 through fixed bearing housings 100 to help guide movement of plate 91 in a vertical direction in response to movement of the piston rod in piston cylinder 98. The fixed bearing housings 100 are securely attached to a support plate 101 extending across the bottom of a superstructure 102. The support plate 101 also supports the piston cylinder 98. It is apparent that this arrangement causes the upper vacuum cups 90 to move as a set within the vertically extending space defined by the outlines of properly aligned bent glass sheets 11 and 12 in response to actuation by the piston extending from piston cylinder 98 without changing the orientation or relative position of each upper vacuum cup 90 relative to the other vacuum cups 90 of the upper set. Therefore, when a properly aligned upper bent glass sheet 11 engages the upper set of vacuum cups 90, the upper bent glass sheet is incapable of becoming misaligned and/or misoriented while it remains engaged by the upper vacuum cups 90 and moves in unison wth the vacuum cups 90 in a vertical direction within the vertically extending space.

Movement of the piston operating from the vertical piston cylinder 98 is controlled between an upward position wherein the upper set of vacuum cups 90 are supported along a curved surface generally parallel to the upper position of the upper bent glass sheet 11 when the latter engages the upper set and a lower position wherein the upper bent glass sheet held thereagainst is moved downward to the vicinity of the top surface of the lower glass sheet 12 supported by the lower set of vacuum cups in their intermediate positions.

Another feature of the illustrative embodiment of assembly apparatus comprises longitudinal end edge alignment means. While the particular end edge alignment means described is for use to align non-parallel or parallel longitudinal edges of hot bent glass sheets, it is understood that this longitudinal end edge alignment means is also suitable for use in aligning one or more bent glass sheets at temperatures different than the residual temperature of the bent glass sheets.

Figure 10:
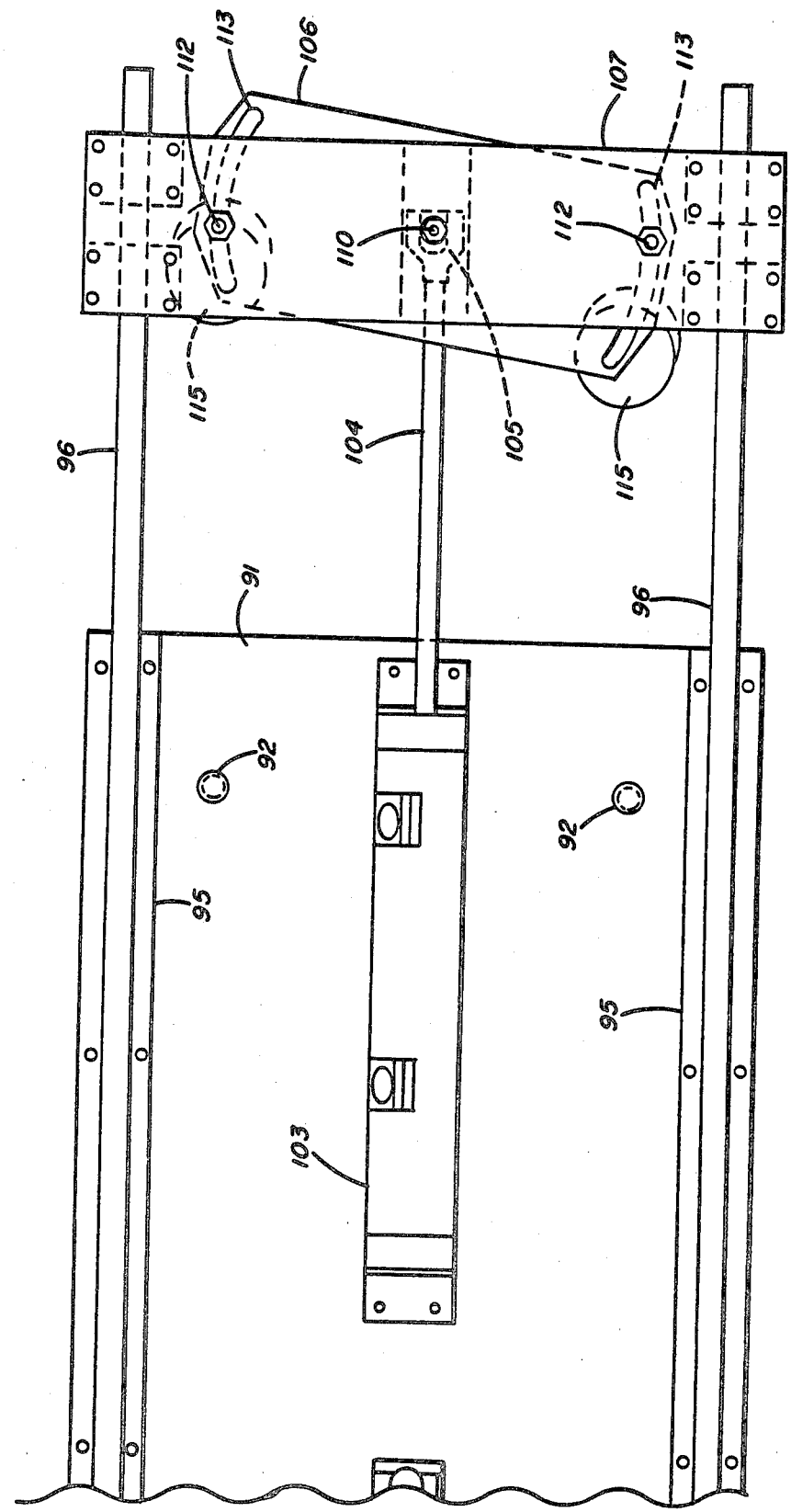
FIG. 10 is an enlarged plan view of an end edge guide means oriented for guiding glass sheets of non-rectangular outline and apparatus for actuating movement of said end edge guide means.
Figure 11:
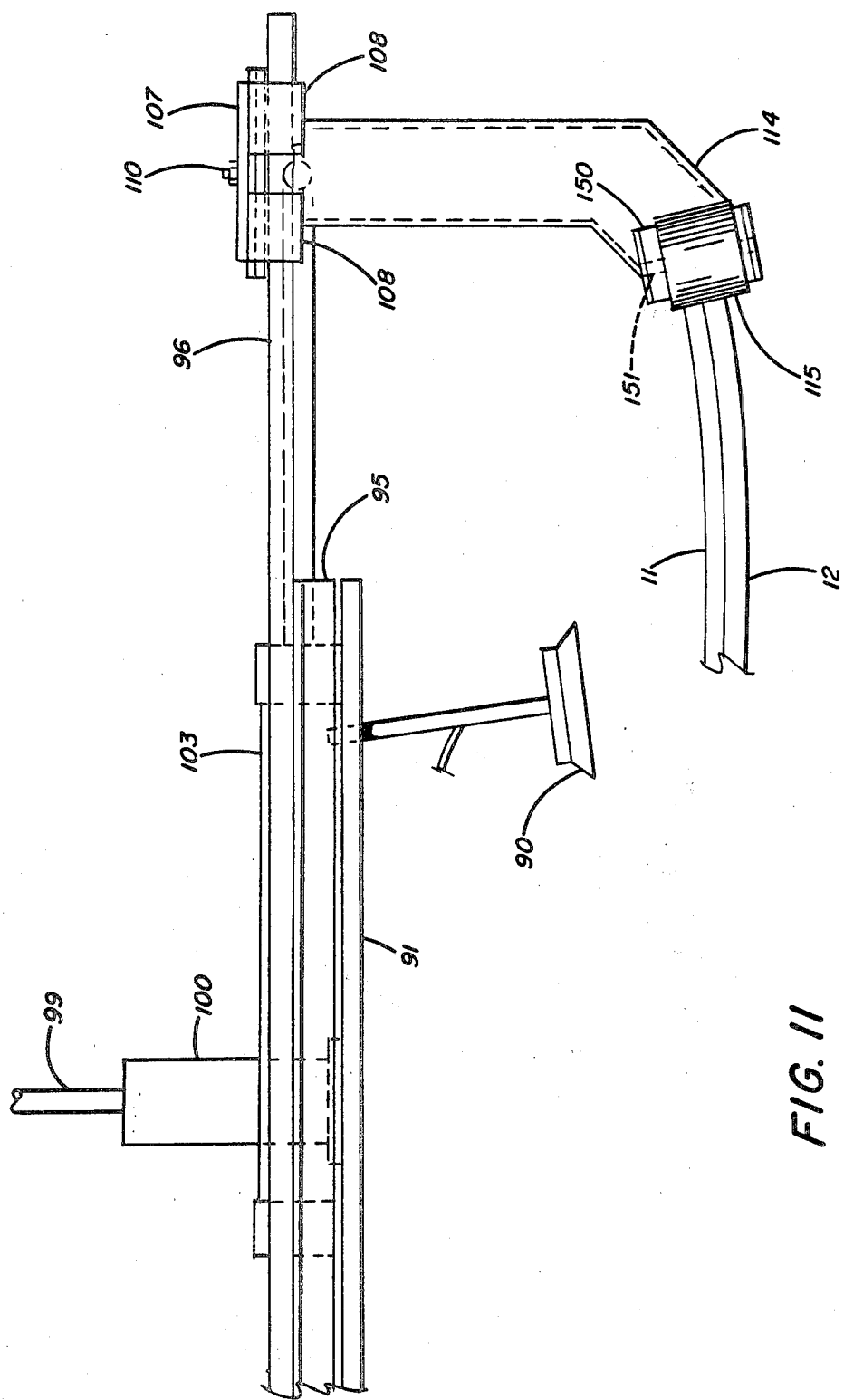
FIG. 11 is a side elevation of the structure shown in FIG. 10.
Figure 12:
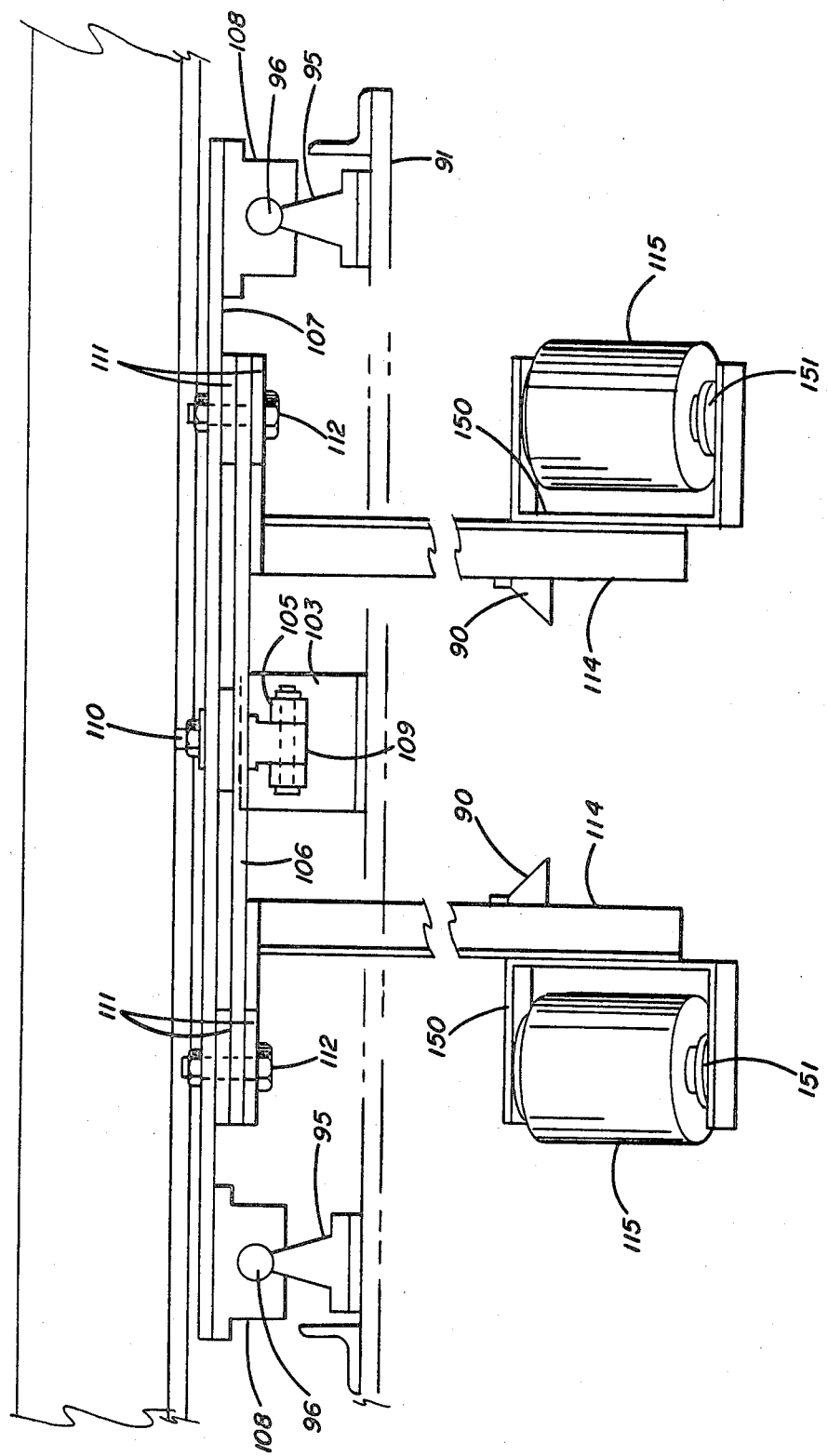
FIG. 12 is an end elevation of the structure shown in FIGS. 10 and 11.

Also attached to the upper surface of plate 91 are a pair of horizontal cylinders 103 (only one of which is shown in FIGS. 10, 11 and 12). The cylinders 103 (also shown in FIG. 4) extend longitudinally of the cross conveyor 40 in opposite directions with piston rods 104 extending longitudinally upstream and downstream relative to cross conveyor 40. A clevis 105 (FIGS. 10 and 12) attaches the outer end of each piston rod 104 to an arcuately slotted plate member 106. The latter is pivotally attached to a bearing support member 107 through a pivot pin 110 (FIGS. 4, 10, 11 and 12). The member 107 has bearing housings 108 (FIGS. 11 and 12)

extending downward from its lower surface in such a manner that each pair of bearing housings slidably engages one or the other longitudinal rails 96.

An eye member 109 (FIG. 12) extending through an aperture in plate member 106 is fixed to bearing support member 107 and is attached to the clevis 105 (FIG. 12). The arcuately slotted plate member 106 also receives the pivot pin 110 in such a manner that the arcuately slotted plate member 106 is free to rotate in a horizontal plane about a vertical pivot axis defined by eye member 109. Layers 111 (FIG. 12) of a low friction material, such as various halogenated polyethylene compositions sold commercially under the trademarks PACTENE and TEFLON, are applied against the major surfaces of the arcuately slotted plate member 106 to facilitate its rotation. A pair of shoulder bolts 112 (FIGS. 10 and 12) with suitable lock nuts extend through each of the arcuate slots 113 of the arcuately slotted plate member 106 and aligned bolt openings in the bearing support member 107 to fix the orientation of the arcuately slotted plate member 106.

A pair of angled supports 114 (FIGS. 2, 3, 11 and 12) is rigidly attached to each arcuately slotted shaped member 106 and terminates in a roll housing 150 (FIGS. 10 to 12) that supports on obliquely extending axle 151 for supporting an end edge engaging roll in the form of a linear rotating roll 115 that is in free rotating relation with said axle and which has an axial length sufficient to engage the longitudinal end edge of glass sheet pairs having a range of depths of bend and degrees of curvature within a family of patterns for which the apparatus is designed. Piston rods 104 (FIGS. 4 and 10) actuate longitudinal movement of the linear rotating rolls 115 between carefully controlled positions of the piston rods that bring the rolls 115 toward and away from engagement with one or the other opposite longitudinal end edges of a bent glass sheet pair to form part of longitudinal edge alignment means that either aligns the pair of bent sheets in proper longitudinal alignment with the assembly station 42 or retracts out of engagement with said sheets. The linear rotating rolls are supported for movement in horizontal directions in a horizontal plane vertically spaced from the horizontal support defined by the rolls of the cross conveyor 40 and from the side edge alignment rolls 80 and 89.

The lines of orientation of the tangents common to the linear rotating rolls 115 are shown in FIG. 10 in the orientation required to engage glass sheets of non-rectangular outline. However, these lines can be adjusted to conform to any desired oblique orientation of the longitudinal end edge at the corresponding longitudinal end portion of the shaped glass sheets to be assembled by adjusting the orientation of the arcuately slotted plate member 106 relative to the bearing support member 107 about the pivot pin 110 (which serves as a common pivot axis for a pair of linear rotating rolls 115) and locking the shoulder bolts 112 securely along arcuate slots 113 when the arcuate slotted plate member 106 is in a desired orientation about said common pivot axis.

The linear rotating rolls 115 are free to rotate about the axles 151 that are oblique to the vertical and approximately parallel to the orientation of the end edge surfaces of the most sharply bent glass sheets of the family of patterns for which the apparatus is designed. The linear rotating rolls can be used to align the longitudinal end edges of glass sheets bent to angles of bending ranging from the exact angle of sharpest bend to angles of approximately 45 degrees more curvature than the angle of sharpest bend. In other words, the linear rotating rolls are mounted to rotate about oblique axes that extend upwardly and inwardly from the vertical at a minimum oblique angle that is exactly parallel to the longitudinal edge surface of glass sheets bent to a concave elevational configuration. The maximum oblique angle for mounting the linear rotating rolls can exceed the minimum angle by as much as approximately 45 degrees, depending on the thickness and difference in length between the upper and lower bent glass sheets of the pair being assembled. The rolls 115 are made of a soft rubber composition, preferably 50 to 55 Shore A durometer so as not to mar the glass edges on engagement therewith, even when the rolls 115 do not abut in exact parallel relation to the end edges of the glass. The length of the linear rotating rolls 115 is sufficiently long to permit the rolls to engage longitudinal end edges of bent glass sheet pairs that are bent to various depths of bend within the family of patterns for which the apparatus is designed.

Superstructure 102 is rigidly fixed to a pair of upper horizontal cross beams 116 (FIGS. 1 to 4) of a main frame structure 117 by a pair of longitudinal angles 118. Each of the horizontal cross beams 116 supports a transverse horizontal rail 119. The latter rails extend between the assembly station 42 and the flexible interlayer sheet loading station 43. A carriage 120 is suspended from rails 119 through bearing housings 121. A piston from a cylinder 122 is connected through a clevis 123 to a cross member 124 forming part of the superstructure of the carriage 120. The piston 122 is pivotally mounted on the main frame structure 117 so that its piston rod actuates movement of the carriage 120 along the rails 119 between the vacuum mold loading station 43 and the assembly station 42.

Figure 2:
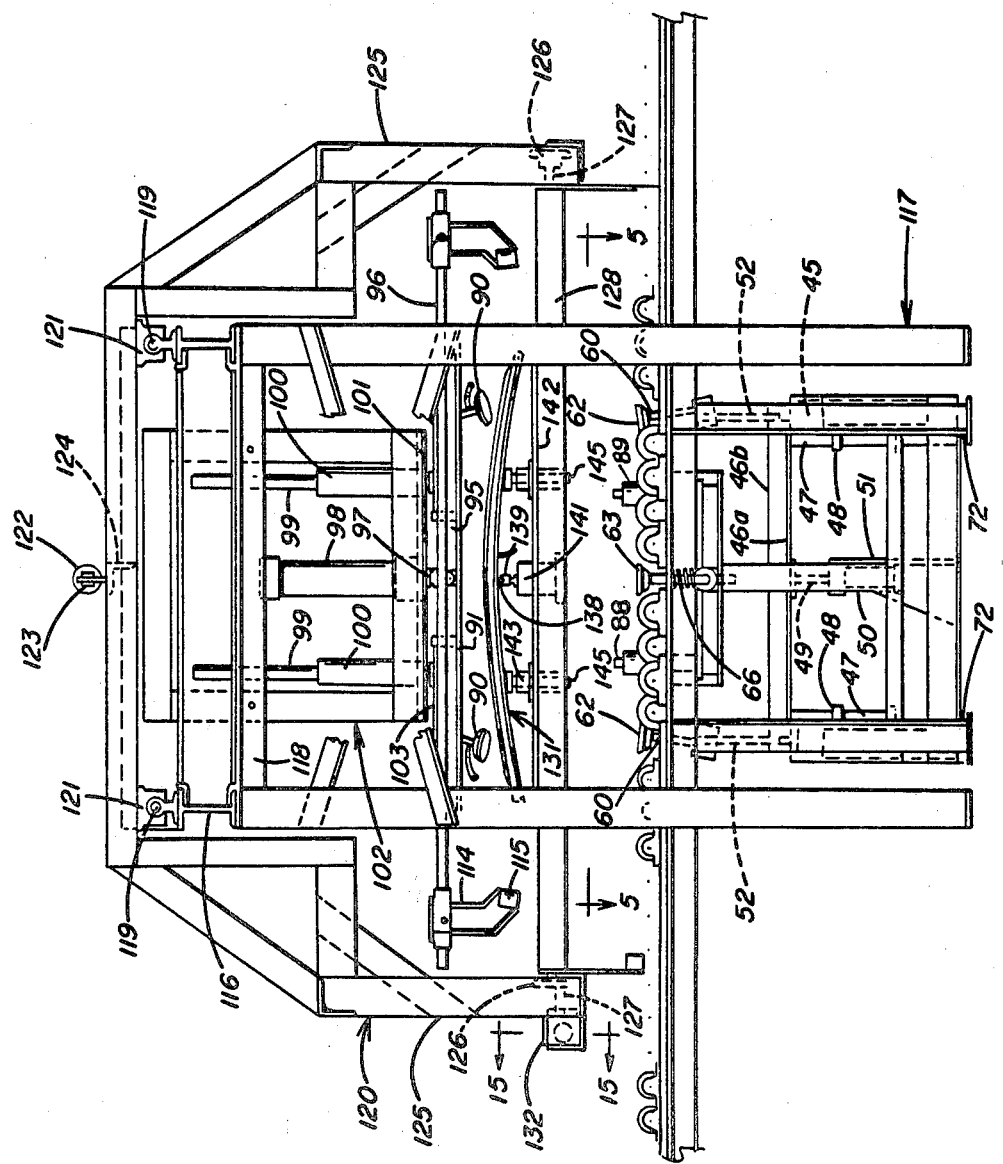
FIG. 2 is a front elevational, structural view of an empty assembly station of the present invention, with upper and lower sets of vacuum cups for supporting bent upper and lower glass sheets retracted and a shaped vacuum mold oriented in a convex elevational configuration for mounting a sheet of flexible interlayer material thereon, with parts omitted to show other parts more clearly.
Figure 3:
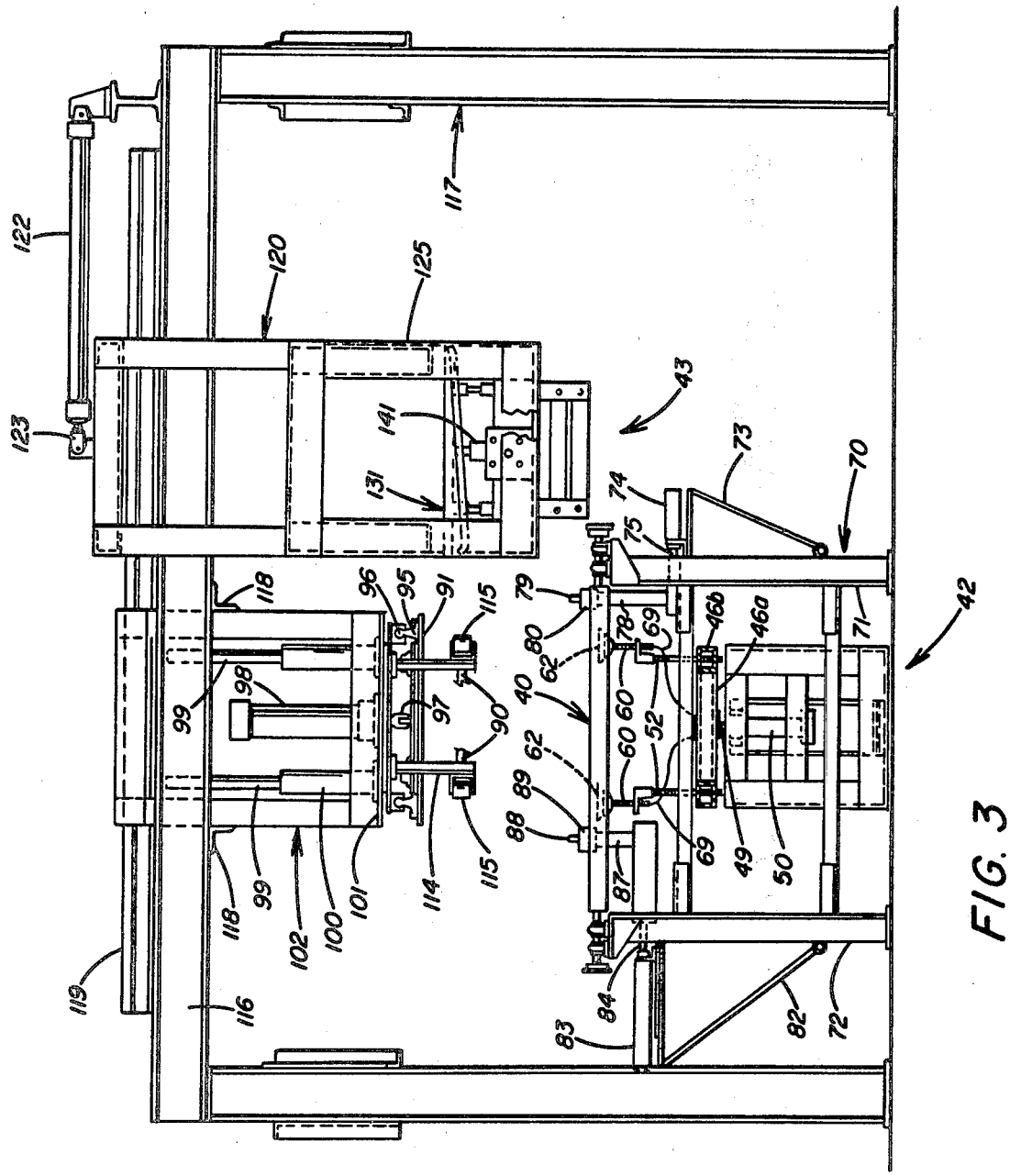
FIG. 3 is a side elevation of the empty assembly station depicted in FIG. 2, with some parts broken away and some parts omitted to show certain parts more clearly.
Figure 15:
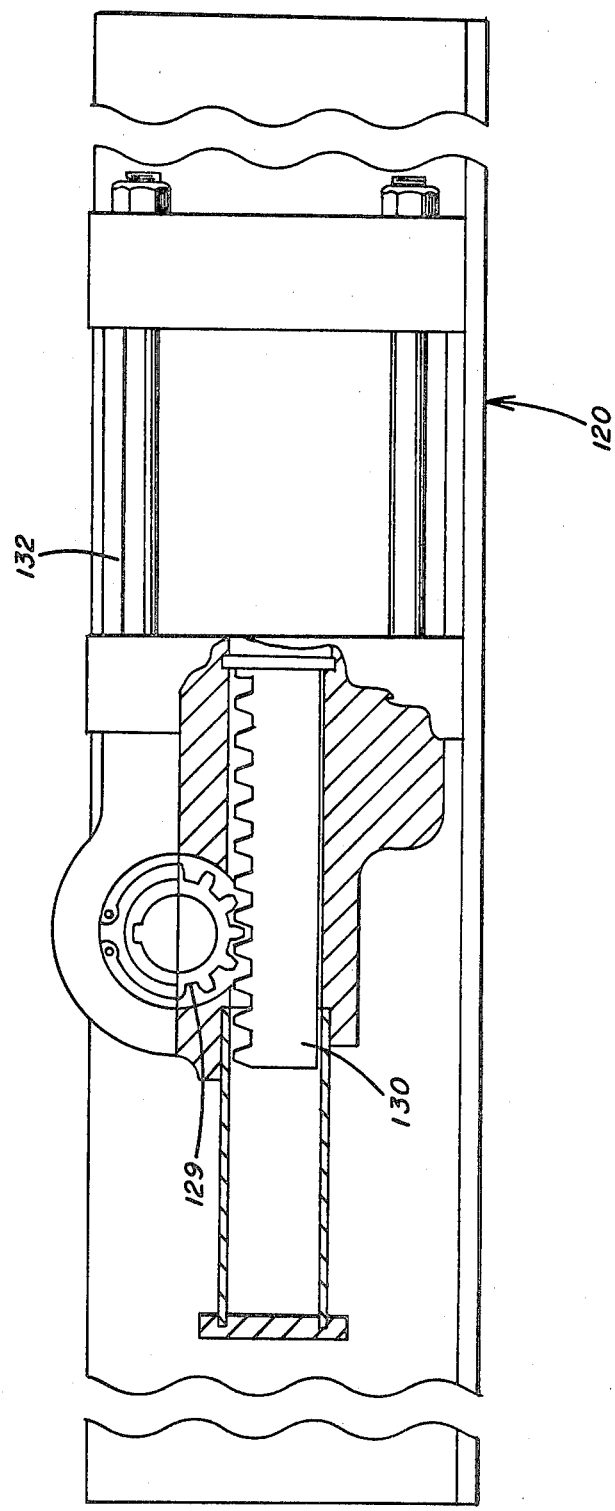
FIG. 15 is a cross-section of a rack and pinion type of rotary actuation for pivoting the vacuum mold, taken along the line 15—15 of FIG. 2.

The carriage 120 has two depending brackets 125 (FIGS. 2 and 3) that support a pair of longitudinally and horizontally aligned bearing housings 126 (FIG. 2) that receive a pair of stub axles 127 interconnected by a box-like housing 128 of rectangular cross-section. A mounting plate 142 is attached to housing 128 for rotation therewith. A rotary actuator (FIG. 15) comprises a pinion 129 operatively connected to one of the stub axles 127 to rotate the box-like housing 128 and its attached mounting plate 142 through an angle of 180 degrees about the horizontal longitudinal axis defined by the stub axles 127. Referring to FIG. 15, the pinion 129 fixed to rotate with one of the stub axles 127 engages an elongated rack 130 which substitutes for a piston rod for linear movement relative to a piston housing 132 (FIGS. 1 and 2). The latter is supported on a lower horizontal beam of carriage 120. Linear movement of the rack 130 causes pinion 129 to rotate, thereby causing the box-like housing 128 and its mounting plate 142 to rotate about stub axles 127.

A vacuum chamber 131 (FIGS. 13 and 14) has a convexly curved apertures wall 133 having an array of apertures 134 and a concavely curved wall 135. Both walls are constructed of ⅛ inch (3.1 millimeters) thick aluminum sheets. The sheets are separated by a rigid, shaped marginal separator frame 136 and an array of spacers 137 formed of rubber blocks. The latter are distributed throughout the extent of the vacuum mold 131 to maintain a space between walls 133 and 135 of uniform thickness enclosed within the marginal frame 136.

The rubber spacers are one inch (2.54 centimeters) square and one-half inch (1.27 centimeters) thick and are separated from one another to form criss-crossing rows. Sufficient rigidity to maintain a space of constant width is provided with rubber blocks having a Shore A durometer of 55. The apertures 134 form a checkerboard array on one inch (2.54 centimeters) centers and are 1/32 inch (0.8 millimeters) in diameter. A series of tightening bolts extend through the marginal separator frame 136 and through alinged marginal apertures in walls 133 and 135 to provide a tightly closed unitary vaccum mold.

As seen in FIGS. 2, 13 and 14, an eye 138 is welded to the geometric center of concavely curved wall 135 and engages a clevis 139 (FIG. 2). The latter is fixed to the end of a rod that extends from a piston housing 141. The latter is mounted to the box-like housing 128 and passes through an opening in the mounting plate 142. The mounting plate 142 supports a series of bearing housings 143 which receive alignment pins 145. The latter extend from the concavely curved wall 135 of the vacuum mold 131 to which they are fixed. The rod from piston housing 141 adjusts the distance of the vacuum mold 131 from mounting plate 142. When the piston from cylinder 122 extends, carriage 120 occupies a position to support the vacuum mold 131 in proper longitudinal and transverse alignment with the vertically extending space within which can be found the aligned bent glass sheets 11 and 12 at the assembly station 42.

A vacuum stem 147 (FIGS. 13 and 14) extends from the concavely curved wall 135 of the vacuum mold 131 and is connected to a line that is connected through suitable valves (not shown) to either a vacuum source or a source of pressurized air, as desired during an assembly cycle. If desired, a separate stem can be provided to connect directly to a source of pressurized air in combination with the vacuum stem 147.

When the rack 130 moves linearly with respect to pinion 129, the vacuum mold 131 rotates with the box-like housing 128 and mounting plate 142. The length of the rack is such as to allow the vacuum mold 131 to rotate 180 degrees about a horizontal axis defined by the stub axles 127. The piston within housing 132 controls the rotational movement of the vacuum mold 131 with the box-like housing 128 and mounting plate 142 relative to the carriage 120 from an orientation wherein the apertured wall 133 assumes a convex elevational configuration to one where the apertured wall assumes a concave elevational configuration.

In addition, the vacuum mold 131 moves with the carriage 120 between the vacuum mold loading station 43 to one side of the path of glass sheet movement defined by cross conveyor 40 and the assembly station 42 across the conveyor 40. The piston in housing 122 and clevis 123 actuate this movement cycle through cross member 124 of the carriage 120.

Extension of the rod from piston 122 is inhibited until the rack 130 moves to the end of its permitted movement at which time the vacuum chamber 131 rotates with mounting plate 142 to an orientation at which the curved aperture wall 133 has a concave elevational configuration and the upper set of vacuum cups 90 occupy their raised positions and the lower set of vacuum cups 62 and 63 occupy their uppermost positions. The rod extends from pistons 122 to move the oriented vacuum chamber 131 into a position at the assembly station 42 where the vacuum chamber 131 is directly aligned over the lower glass sheet 12. With the rod from piston 122 fully extended, the rod from piston housing 141 is fully extended to enable the flexible sheet 14 of interlayer material to engage the upper surface of the lower bent glass sheet 12. In order for this desired alignment to take place properly, the glass edge engaging positions of the linear rotating rolls 115 and side edge engaging rolls 80 and 89 must be carefully adjusted by precise adjustments of the location and stroke of the actuating pistons that control the movement of the edge engaging rolls so that all four pairs of rolls 115, 80 and 89 are in glass engaging positions that insure the alignment of the lower bent glass sheet 12 with the position of the vacuum mold 131 at the assembly station 42 when the rod from piston 122 is fully extended.

Piston rod 49 actuates the lifting of the vertically movable table 46 in response to the arrival of a bent glass sheet pair at the assembly station 42 along cross conveyor 40. The end lower vacuum cups 62 are oriented to face upward and inward so as to be in flat facing relation to different localized portions of the bottom surface of the lower glass sheet of the bent glass sheet pair. The upper vacuum cups 90 are oriented and arranged so that each upper vacuum cup 90 is aligned to be in flat facing relation to different localized portions of the top surface of the upper glass sheet of the bent glass sheet pair. The middle lower vacuum cups 63 are oriented to be in flat facing relation with different localized areas in the central portion of the longitudinal dimension of the bottom surface of the lower glass sheet of the bent glass sheet pair and are biased upward by springs 66 to be a fraction of the glass sheet thickness higher than the mean datum plane of the curvature defined by the bottom surface of the glass sheet at the localized areas of engagement. This arrangement biases the lower glass sheet upwardly a slight amount to guard against entrapment of air or other vapor when the flexible interlayer sheet 14 is applied against the top surface of the lower bent glass sheet 12 when the subassembly is made, and also when the upper bent glass sheet 11 is applied against the top surface of the interlayer sheet when the subassembly is converted into a sandwich to be laminated. To further insure the ability of the springs 66 to bias the lower middle vacuum cups 63 upwardly, the upper set of vacuum cups 90 has no vacuum cups in the central portion of the vertically extending space that intersects the assembly station 42.

Since the end lower vacuum cups 62 and the middle vacuum cups 63 are mounted onto the table 46 in fixed adjustment thereto, piston rod 49 also actuates movement of the lower vacuum cups 62 and 63 in unison to lift the lower glass sheet 12 from the cross conveyor 40 when raised. The upper vacuum cups 90 are adjustably fixed to apertured plate 91 which is actuated by the piston in piston cylinder 98 to move the upper vacuum cups 90 vertically in unison with the apertured plate 91. The parallel vertical axes of the piston cylinders 50 and 98 and the vertical guide rods 47 and 99 insure that the sets of vacuum cups move only in vertical directions within the vertically extending space of the assembly station 42. This insures maintaining alignment of the upper bent glass sheet 11 with the lower bent glass sheet 12 even when separated. Such alignment maintenance facilitates replacing the upper bent glass sheet in alignment with the lower bent glass sheet when the sandwich is assembled.

The automatic assembly of sandwiches of a pair of bent glass sheets and a sheet of interlayer material depends on the coordination of operation of various actuating mechanisms of the illustrative embodiment including the cross conveyor 40, the piston in piston cylinder 98, the application of vacuum or pressurized air to the vacuum cups 90, 62 and 63 and vacuum mold 131, the piston rod 49, the piston rods 75 and 84, the piston rods 104, the piston from piston cylinder 122 and the operation of the rack 130 to rotate the pinion 129 and the vacuum mold 131. A typical cycle will now be described.

The timing sequence of the various actuating mechanisms can be controlled by any well known timer control circuit or each actuating mechanism can actuate a limit switch to control the timing of the actuation of a succeeding actuating mechanism in the system. Either arrangement is well known in the art of controlling an operating cycle for different elements in timed sequence and is suitable to operate the apparatus just described.

At the beginning of an assembly cycle, the vacuum mold 131 is oriented into a convex elevational configuration and is located at the vacuum mold loading station 43 to one side of the cross conveyor 40 as the carriage 120 is retracted to that station. In this position, an operator is able to mount a sheet 14 of flexible interlayer material in unwrinkled condition onto the upwardly facing surface of convex elevation of the vacuum mold 131. Vacuum is applied at this time to the vacuum mold to hold the flexible sheet of interlayer material thereagainst in the orientation at which it is applied. While not absolutely necessary, it is convenient to use sheets of interlayer material of slightly larger outline than the outlines of the bent glass sheets 11 and 12 to assure complete alignment between the flexible sheet 14 of interlayer material and the bent glass sheets 11 and 12 to be assembled.

At the start of a cycle, the lower vacuum cups 62 and 63 are supported in spaced relation to the bottom surface of the lower glass sheet of the pair of bent glass sheets as the latter arrives at the assembly station 42 supported on rolls of the cross conveyor 40. The latter rolls stop rotating when the glass sheet pair arrives at the assembly station 42. The pair of bent glass sheets stops in approximately the same position and orientation it will occupy during the assembly operation. While it is unusual for the bent glass sheets in the pair to become misaligned, the glass sheets may sometimes be misaligned relative to one another in their transverse dimension. It is less likely but also possible that the bent glass sheet pair stops at a position that is misaligned longitudinally and/or transversely of the desired position. The bent glass sheet pair may also be misoriented. Side edge alignment rolls 80 and 89 and the linear rotating rolls 115 of the end edge alignment means correct these problems in a manner to be described in detail.

The lower middle vacuum cups 63 are biased upwardly to be closer to the bottom surface at the central portion of the lower bent glass sheet 12 than the end lower vacuum cups 62 are spaced from the end portions of the bottom surface that they face. Since all the lower vacuum cups 62 and 63 move in unison with table 46, the middle lower vacuum cups 63 engage areas in the central portion of the lower glass sheet 12 before the end lower vacuum cups 62 engage its end portions so as to flex the lower glass sheet 12 upward in its central portion. At the beginning of the cycle, neither vacuum nor pressurized air is applied to any of the lower vacuum cups 62 and 63 or the upper vacuum cups 90.

As the pair of bent glass sheets enters the assembly station 42, the bottom side edge alignment rolls 80 and the top side edge alignment rolls 89 are retracted from engaging the longitudinal side edges of the bent glass sheets that eventually form the bottom and top side edges of the bent laminated windshield that is fabricated. Also, the linear rotating rolls 115 of the end edge alignment means are retracted from one another to be spaced apart farther than the chord length of the bent glass sheets of the pair. Each linear rotating roll 115 of each pair is arranged relative to the other roll 115 at the end along a plane that is parallel to the line defined by the points along the end edge of the bent glass sheets that usually extend obliquely of the length of the glass sheets (forming the so-called A-post line). This is accomplished by pivoting each arcuately slotted plate member 106 about pivot pin 110 which forms the common pivot axis for each pair of linear rotating rolls 115 to orient and lock arcuately slotted plate member 106 at a desired orientation relative to bearing support member 107 to conform the common tangent lines between linear rotating rolls 115 to the orientation of the A-post lines. The linear rotating rolls 115 rotate freely about obliquely extending axes that are approximately parallel to the end edge portions of the bent glass sheet pair.

When the pair of bent glass sheets arrives at the assembly station 42, the top and bottom side edge alignment rolls 89 and 80, respectively, are in their laterally separated positions. Piston 98 extends to lower the upper set of vacuum cups 90 into a lowered position a slight distance above the top surface of the upper glass sheet 11 when the lower glass sheet 12 rests on the rolls of cross conveyor 40. At this time, piston rods 84 and 75 and 104 move inward toward their respective glass edge engaging positions in unison to cause side edge alignment rolls 89 and 80 to move toward the inward positions defined by stops controlling transverse extended movement of the piston rods 84 and 75 and the linear rotating rolls 115 move toward inward positions defined by stops controlling longitudinal retracted movement of piston rods 104. These glass edge engagement positions are shown in FIGS. 16 and 17.

Figure 4:
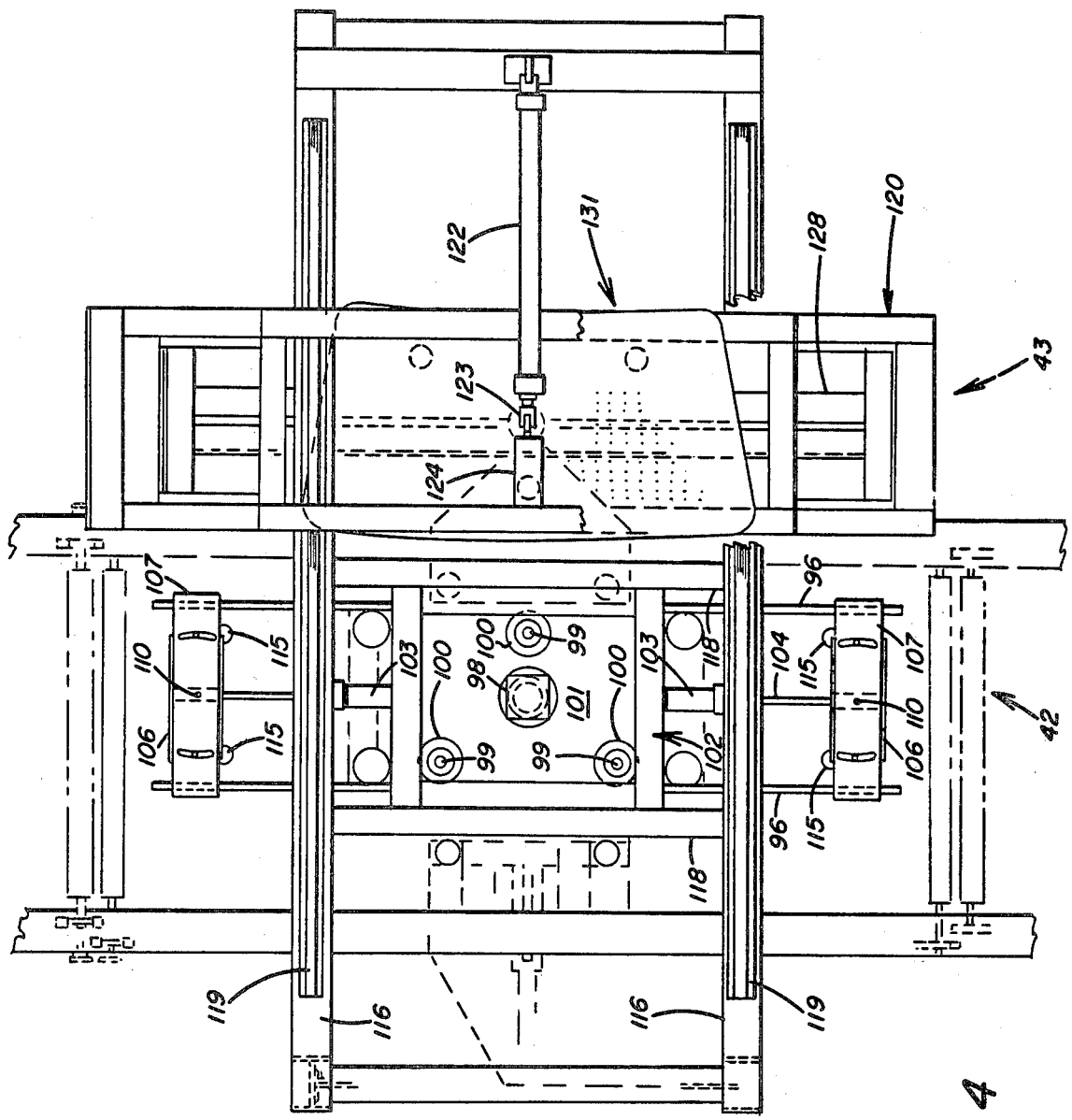
FIG. 4 is a top plan view of the empty assembly station depicted in FIGS. 2 and 3 with some parts broken away to show other parts.

While the arcuately slotted plate members 106 are shown as extending parallel to the bearing support members 107 in FIGS. 4 and 11 to support the linear rotating rolls 115 along lines normal to the path defined by cross conveyor 40 for aligning glass sheets of rectangular configuration, it is understood that the plate members 106 may be fixed in any angular orientation about pivot pins 110 relative to the bearing support members 107, such as in FIG. 10, to have the linear rotating rolls 115 located with their corresponding portions aligned with transverse lines extending obliquely to intersect spaced engagement positions along the end edges of the bent glass sheet pair. Thus, the side edge alignment rolls 89 and 80 and the linear rotating rolls 115 move into glass edge alignment positions to align and orient the bent glass sheet pair comprising bent sheets of non-rectangular outline relative to the vertically extending space intersecting the desired assembly positions for the sheets 11, 12 and 14. Such engagement of rolls 80, 89 and 115 with the edge of the bent glass sheet pair orients and aligns the pair of bent glass sheets properly relative to one another and also orients and aligns a reference line through the thickness of the bent glass sheet pair that coincides with a corresponding reference line through the assembly position for the flexible sheet of interlayer material 14 that is defined by complete extension of the rod from piston 122.

Figure 17:
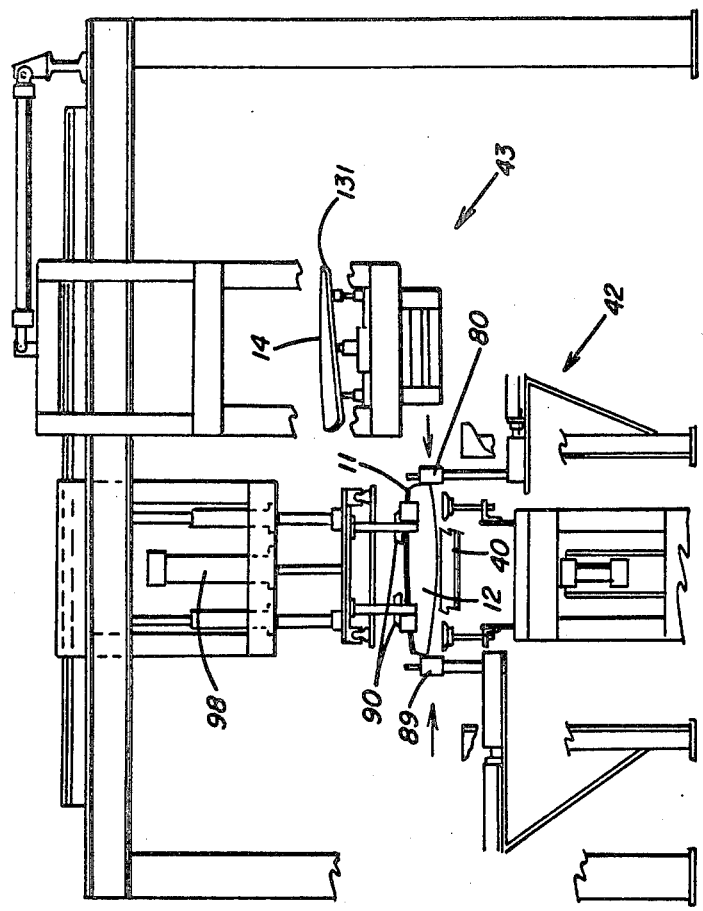
FIG. 17 is a fragmentary schematic side elevational view of the assembly station also showing a vacuum mold loading station taken at the moment depicted in FIG. 16.
Figure 16:
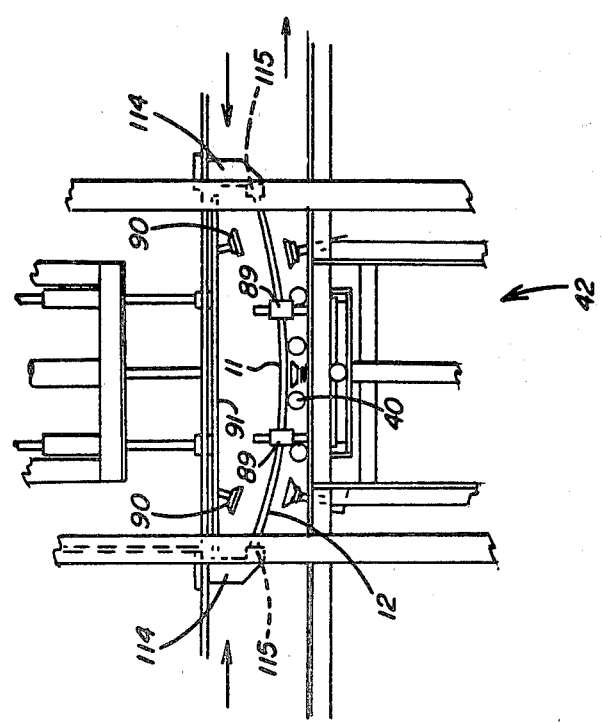
FIG. 16 is a schematic front elevation view of the assembly station showing a bent glass pair supported on a cross conveyor at the assembly station at the early stage of an assembly cycle.

The lower vacuum cups 62 and 63 remain retracted at this stage of the cycle as depicted in FIGS. 16 and 17. The lower bent glass sheet 12 rests on the rolls of cross conveyor 40 while the upper bent glass sheet 11 nests over lower bent sheet 11 when the edge alignment rolls 115, 80 and 89 orient and align the bent glass sheet pair.

With the pair of bent glass sheets properly aligned and oriented, the linear rotating rolls 115 are retracted and the table 46 is lifted so that the central pair of lower vacuum cups 63 first engages the central portion of the lower glass sheet 12 to bias the central portion slightly upward and then all the lower vacuum cups 62 and 63 engage the biased lower glass sheet. The difference in spacing to the bottom surface of the glass sheet from the spring loaded central lower vacuum cups 63 compared to that of the unloaded end lower vacuum cups 62 is exaggerated in FIGS. 16 and 17. In the meantime, the apertured plate 91 has been lowered to a position wherein the upper vacuum cups 90 are near the top surface of the upper bent glass sheet of the pair. The limit of extension of the piston from piston cylinder 98 defines the lowered positions of the apertured plate 91 and the upper vacuum cups 90.

The upward movement of the table 46 continues to a raised position where the top surface of the upper bent glass sheet 11 engages the upper vacuum cups 90. The top and bottom side edge alignment rolls 89 and 80 rise on the reduced upper portions 88 and 79 of vertical guide rods 87 and 78 due to friction against the rising bent glass sheet pair as the table 46 rises with the lower vacuum cups 62 and 63. The side edge alignment rolls 89 and 80 continue to align the bent glass sheet pair transversely until such time as the vacuum cups 62, 63 and 90 engage the bent glass sheets 12 and 11, respectively and vacuum is applied to the vacuum cups. In the meantime, the rack 130 has started to move to rotate pinion 129, box-like housing 128, mounting plate 142 and vacuum mold 131. The latter maintains its vacuum to hold the flexible interlayer sheet thereagainst as it rotates. The linear rotating rolls 115 are fully retracted at this stage of the cycle.

At this stage of the assembly cycle, retraction of the linear rotating rolls 115 actuates the application of vacuum to the vacuum cups 62, 63 and 90 so that both sheets of the bent glass sheet pair are held securely in position by vacuum so that it is no longer necessary to hold the side edge alignment rolls 89 and 80 against the opposite side edges of the bent glass sheet pair. Consequently, with vacuum on upper vacuum cups 90 and on lower vacuum cups 62 and 63, piston rod 84 is retracted to retract the bottom side edge alignment rolls 80 and piston rod 75 is retracted to retract the top side edge alignment rolls 89. With frictional engagement against the side edges of the glass sheet pair ended, rolls 80 drop on vertical guide rods 78 and rolls 89 drop on vertical guide rods 87 to positions in horizontal alignment with but laterally recessed from the positions that will intersect the bottom and top side edges of the next bent glass sheet pair to arrive at the assembly station 42.

While it is most convenient for design purposes that the specific embodiment described provides that both pairs of linear rotating rolls 115 are longitudinally movable equal distances in unison between longitudinally spaced positions separated by distances greater than the longitudinal distances between portions of the longitudinal end edges engaged by corresponding linear rotating rolls of each pair and positions engaging said glass end edge portions simultaneously, it is understood that longitudinal alignment can be obtained by moving said pairs of linear rotating rolls different distances longitudinally to engage or disengage the adjacent end edge of the bent glass pair. Similarly, while both pairs of side edge alignment rolls 80 and 89 are more conveniently designed to be transversely movable in unison for equal distances between transversely spaced positions of disengagement separated by distances greater than the width of the widest of a family of glass sheet patterns to be assembled measured between corresponding positions of the opposite side edges engaged by said side edge alignment rolls and side edge engaging positions approximately equal to the transverse distance between said corresponding portions, it is understood that it is also permissible to move the pairs of side edge engaging rolls 80 or 89 different transverse distances in a transverse direction to obtain appropriate transverse alignment. However, the bent glass sheets must be engaged simultaneously by both pairs of linear rotating rolls 115 and both pairs of side edge alignment rolls 80 and 89 before the vacuum cups 62, 63 and 90 engage the facing surfaces of the bent glass sheets of the pair. Only the linear rotating rolls 115 are disengaged from the glass sheet end edges and the side edge alignment rolls 80 and 89 remain engaged when the lower vacuum cups engage the bent glass sheet pair prior to moving the pair off the support provided by the cross conveyor 40.

Vacuum continues via the upper vacuum cups 90 as well as the lower vacuum cups 62 and 63 while the rack 130 continues to move to rotate the box-like housing 128, the mounting plate 142 and its connected vacuum mold 131 in a counter-clockwise direction toward an orientation of concave elevational configuration in which the shaped vacuum mold 131 continues to support the flexible sheet of interlayer material thereagainst by continued application of vacuum. Now, the apparatus is ready to separate the upper and lower glass sheets from one another.

At this time, the piston in piston cylinder 98 is ready to begin to raise the apertured plate 91 in response to outward movement of the angled supports 114, to form a gap between the upper and lower bent glass sheets in the vertically extending space at the assembly station 42. Simultaneously, the rack 130 has caused the vacuum mold 131 to rotate a considerable portion of 180 degrees of rotation.

By the time the next portion of the assembly cycle has occurred, the piston cylinder 98 has lifted the plate 91 with vacuum continuing on the upper vacuum cups 90 and the lower vacuum cups 63 and 62 support the lower glass sheet in position above the cross conveyor 40 and continue to apply vacuum to the lower glass sheet. The lifting of the upper glass sheet by the lifting of the plate 91 and the maintenance of vacuum through the vacuum cups 90 causes a widening gap to develop. In the meantime, the rack 130 has moved to complete the pivoting of the vacuum mold 131 into a rotational position where its elevational configuration is now of the same concave elevation as the concave elevational configuration of the bent glass sheet pair.

The piston rod 49 maintains the table 46 in the fixed intermediate position. When the rack has completed its movement to pivot the vacuum mold 180 degrees and the piston of piston cylinder 98 has moved the plate 91 upwardly to its upward position, the rod from piston 122 becomes free to extend. Actuation of the piston of piston cylinder 122 moves the vacuum mold 131 into the gap between the upper and lower bent glass sheets and into vertical alignment over the lower bent, aligned glass sheet 12 in the vertically extending space that intersects the assembly position at the assembly station 42. During the time that the vacuum mold 131 is moving into the gap, its pivoting has been completed.

The actuation of the piston 122 continues until the vacuum mold 131 supporting the unwrinkled flexible sheet 14 of interlayer material by vacuum on its under surface is aligned between the upper glass sheet supported by vacuum by the upper vacuum cups 90 and the lower glass sheet supported by vacuum by the lower vacuum cups 62 and 63.

While the specific embodiment of this invention maintains the upper bent glass sheet in vertical alignment with the lower bent glass sheet when the bent glass sheets are separated for the introduction of the sheet of flexible interlayer material into a position of alignment over the lower bent glass sheet, and it is most convenient to design the assembly station in this manner, the position of separation for the upper bent glass sheet can be any position that provides sufficient gap to insert the sheet of flexible interlayer material and its supporting vacuum mold into a position of alignment with said lower bent glass sheet to transfer said sheet of flexible interlayer material from said vacuum mold to said lower bent glass sheet to form a bent subassembly as long as the apparatus is capable of returning the upper bent glass sheet to a position of alignment with said lower bent glass sheet after the sheet of flexible interlayer material is deposited thereon.

Figure 19:
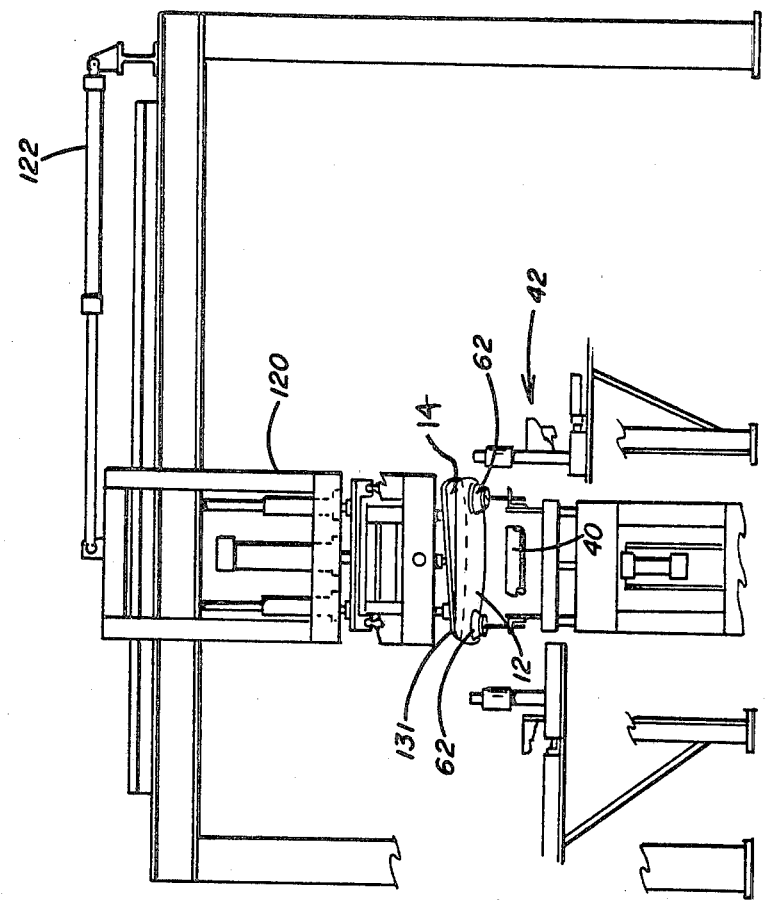
FIG. 19 is a view similar to that of FIG. 17 taken simultaneously with FIG. 18.
Figure 18:
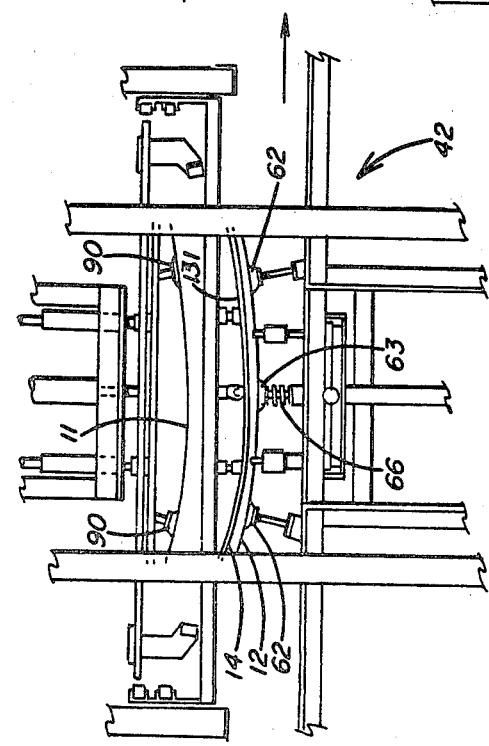
FIG. 18 is a view similar to that of FIG. 16 taken at an intermediate stage in the cycle of operation of the assembly station of this invention.

As stated previously, the springs 66 bias the lower central vacuum cups 63 slightly above the mean datum plane of the curvature of the lower bent glass sheet 12 to bias the lower glass sheet slightly upward in its central portion. The interlayer sheet 14, supported on the vacuum mold 131, arrives at the vertically extending space in slightly spaced relation above the lower glass sheet 12 of the bent glass sheet pair and the bottom surface of the upper bent glass sheet 11 of the pair. The state of the apparatus elements at this moment is depicted in FIGS. 18 and 19.

As soon as the vacuum mold 131 arrives at the assembly station 42, the piston from piston housing 141, which has been recessed throughout the previous steps of the cycle, is extended to lower the vacuum mold 131 while the latter supports the flexible sheet 14 of interlayer material thereon by vacuum against its lower apertured wall 133 which is now concavely curved in elevation. The latter now moves downward to apply the unwrinkled flexible interlayer sheet 14 against the top surface of the lower glass sheet 12. The alignment pins 145 insure that the vacuum mold 131 remains in alignment with the vertically extending space as it lowers toward the lower glass sheet. The stroke of the piston from piston housing 141 is closely controlled to insure that the sheet of flexible interlayer material engages the top surface of the lower bent glass sheet 12 but is not so long as to develop a fracturing stress in the lower bent glass sheet 12.

Because of the spring biasing of the central lower vacuum cups 63 against the central portion of the lower bent glass sheet, the flexible sheet 14 of interlayer material makes initial contact in the central portion of the lower glass sheet that is supported by the biased vacuum cups 63 and as the vacuum mold 131 continues to lower against the top surface of the lower glass sheet, the area of contact between the flexible interlayer sheet, still supported by vacuum against the lower convexly curved apertured wall 133 of the vacuum mold 131, gradually increases toward the longitudinal end edges of the lower glass sheet 12. This causes any fluid, such as air, to be forced out toward the end edges of the glass as the flexible sheet 14 increases its area of engagement with the top surface of the lower glass sheet 12. Since the glass sheet has considerable residual heat from the bending operation, the interlayer sheet, on making contact with the glass, softens and becomes tacky as it contacts the glass sheet. This tackiness resists relative sliding between the contacted sheets. A subassembly forms comprising an upper sheet of flexible interlayer material and the lower glass sheet with its concavely curved surface facing upward.

As soon as the interlayer sheet 14 makes complete engagement throughout the entire extent of the lower glass sheet, vacuum is discontinued into the vacuum mold 131 to insure that the interlayer sheet 14 separates from shaped apertured wall 133. To further insure this separation, a blast of pressurized air is applied through the supply nozzle 147 to the mold 131 and thence through apertures 134 by a suitable valve switching from a source of vacuum to a source of pressurized air (not shown) in a manner well known in the art. Alternatively, a separate source of pressurized fluid may be connected to the mold 131 for initiation simultaneously with or shortly after the vacuum is discontinued.

Immediately thereafter and while the mold 131 is still pressurized, the piston within piston housing 141 is retracted, the alignment pins 145 insuring that the vacuum mold 131 moves vertically upward in exactly the opposite direction from the one in which it approached the lower glass sheet 12. Pressure on the mold 131 is discontinued. The apertured plate 91 supports the upper vacuum cups 90 with vacuum still applied thereto in the same upward position as before to hold the upper bent glass sheet 11 in spaced relation to provide the gap through which the vacuum mold 131 entered the vertically extending space defined by the spaced bent glass sheets. As soon as the vacuum mold is separated from the sheet of flexible interlayer material forming part of the subassembly that has just been formed, the vacuum mold 131 supported from carriage 120 is ready to return to its original position.

The clevis 123 attached to the piston rod extending from the piston cylinder 122 actuates movement of the carriage 120, carrying with it the vacuum mold 131 denuded of the interlayer sheet 14. As soon as the vacuum mold is clear of the vertically extending space within the assembly station 42, the piston extending from piston cylinder 98 is actuated to begin to move downward to lower the upper glass sheet 11 toward the subassembly 12, 14. Also, as soon as the vacuum mold 131 clears the assembly station 42, rack 30 is actuated to cause pinion 129 to rotate in a clockwise direction to begin to return the vacuum mold 131 to its initial orientation of convex elevation. At this portion of the cycle of operation, subatmospheric pressures are still applied to the vacuum cups 62, 63 and 90 to maintain the glass sheets in separated vertical alignment with one another within said vertically extending space at this stage of the assembly cycle.

Figure 20:
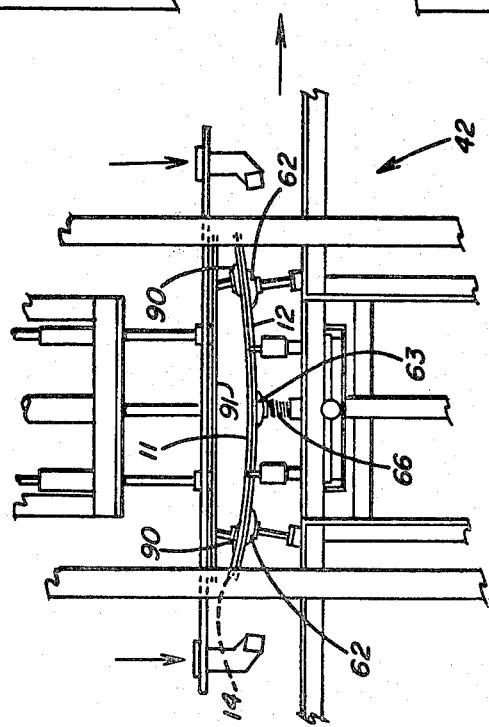
FIG. 20 is a view taken after the view of FIG. 18 and similar thereto, showing the assembly station in a late stage of operation.

With the gap now cleared of the vacuum mold 131, the apertured plate 91 is lowered, thereby lowing the upper bent glass sheet 11 into contact with the upper surface of the interlayer sheet 14 that forms the upper surface of the subassembly of interlayer sheet 14 tacked to the lower bent glass sheet 12. Since the central lower vacuum cups 63 are still spring loaded, and the upper glass sheet 11 has its normal shape, it makes initial contact with the central portion of the flexible interlayer sheet 14 while still hot enough to make the upper surface of interlayer sheet 14 tacky on engagement therewith. As with the lower bent glass sheet 12, the upper bent glass sheet 11 gradually increases the area of engagement with the flexible interlayer sheet 14 in the longitudinally outward directions from the central portion. This arrangement forces any air or other fluids that would othewise be entrapped between the top surface of the flexible interlayer sheet 14 and the bottom surface of the upper glass sheet 11 to be forced out beyond the margin of the sandwich that results. This situation is depicted in FIG. 20.

Figure 21:
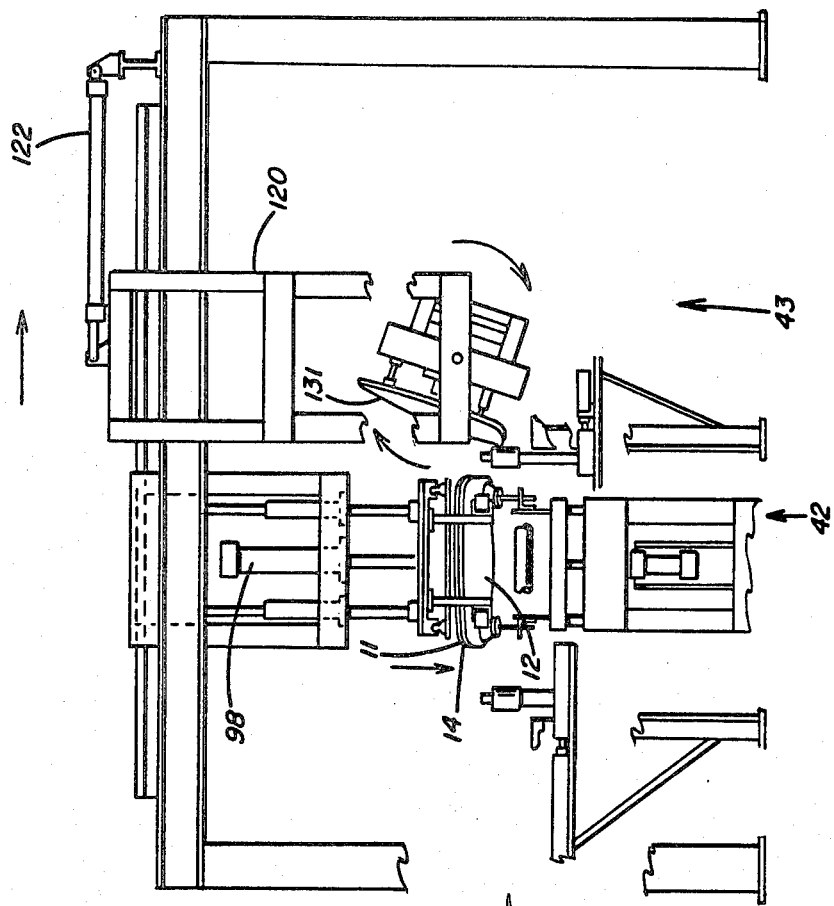
FIG. 21 is a view similar to that of FIG. 19, showing a side view of the assembly station at the moment depicted in longitudinal elevation in FIG. 20.

At the same time, rack 130 continues to move causing pinion gear 129 to rotate. As a result, the vacuum mold 131 also rotates further toward its initial orientation of convex elevation as shown in FIG. 21.

Once the sandwich of two glass sheets and the plastic interlayer has been assembled, the vacuum is discontinued on the vacuum cups, and fluid pressure applied thereto to help separate the vacuum cups from the adjacent bent glass sheet surfaces of the assembly. At this time, with no vacuum applied, the piston rod 49 is lowered to lower the table 46 and the lower vacuum cups 62 and 63 and the piston in cylinder 98 is raised to lift the apertured plate 91 and its supported upper set of vacuum cups 90. When the sandwich lowers to the upper level of the rolls of the cross conveyor 40, the sandwich is supported on the rolls of the cross conveyor 40 without changing its orientation or alignment relative thereto.

The apertured plate 91 and its supported upper vacuum cups 90 are in the upward retracted position to provide clearance for the sandwich to leave the assembly station 42. The table 46 is lowered until all the lower vacuum cups 62 and the spring biased vacuum cups 63 are just below the level of the cross conveyor 40. Thus, the resulting sandwich is ready to move in proper alignment along the cross conveyor 40 from the assembly station 42 toward the roll pressing apparatus 44. The assembly station 42 will then be clear for another bent glass sheet pair to arrive for an assembly treatment similar to the one just described.

While the sandwich and the various structural elements of the assembly station assume the latter positions, the rack 130 has completed its return movement so that the vacuum mold 131 has resumed its original orientation of convex elevational configuration. Applying the vacuum again to the vacuum mold 131 after loading another interlayer sheet 14 on the convexly oriented apertured wall 133 permits an operator to support the flexible interlayer sheet against the vacuum mold 131 in unwrinkled condition so that the interlayer sheet is now ready for assembly between the next bent glass sheet pair that arrives at the assembly station.

Two benefits are derived from the present inventions. One is the saving of energy that results from using the residual heat in the glass sheets to make the interlayer sheet tacky during assembly. Manual handing of the glass sheets is eliminated entirely so that it is unnecessary to cool the bent glass sheets sufficiently to enable operators to handle the glass without undue harm. The other benefit is that automatic assembly apparatus makes it possible to assemble the bent glass sheets in exact alignment with the flexible interlayer sheet, and to have each successive sandwich produced in response to exactly the same sequence of movements of alignment means, vacuum cups and vacuum mold to insure more precise alignment from sandwich to sandwich than is possible from a manual assembly operation.

While the temperatures described herein may vary from pattern to pattern, depending upon the severity of bend imparted to the bent glass sheet pair, in a typical operation, a typical temperature range for the glass sheet pair on entering the assembly station is on the order of 275° to 302° F. (135° to 150° C.) so that the temperature of the top glass sheet 11 is no colder than about 200° F. (93° C.), preferably at least 248° F. (120° C.), when it engages the upper surface of the interlayer sheet 14 during the assembly operation. Of course, the temperature of the lower bent glass sheet 12 when it engages the flexible interlayer sheet is no colder than the plastic engaging temperature of the upper bent glass sheet so that the flexible interlayer sheet becomes tacky on both surfaces due to its engagement with the relatively hot glass sheets. This tackiness is sufficient to prevent sliding of the interlayer sheet relative to the opposite glass sheets on engagement therewith.

The temperature of the sandwich at the end of the assembly process should be sufficiently high to permit the sandwich to be conveyed through at least one pair of prepressing rolls and then be edge sealed at a minimum temperature of approximately 200° F. (93° C.). While it may be possible to reheat the edge of the sandwich after prepressing to facilitate edge sealing, it is preferred to avoid the need for such reheating. Cooling experiments conducted at a temperature of 74° F. (24° C.) using pairs of bent glass sheets, each sheet having a nominal thickness of 90 mils (2.3 millimeters) disclosed an average cooling time of 4 minutes 44 seconds for a pair of sheets to cool from 300° F. (149° C.) to 200° F. (93° C.) when the sheets were nested and an average cooling time of 2 minutes 19 seconds for single bent sheets of such thickness. Pairs of nested bent glass sheets of this nominal thickness cooled from 275° F. (135° C.) to 200° F. (93° C.) in 3 minutes 40 seconds and single bent glass sheets cooled in an average cooling time of 1 minute 49 seconds. These averages were based on 5 readings per experiment (nested sheets versus single sheets) at each temperature range. The assembly apparatus described herein completed the assembly process in 35 seconds from the moment of arrival. While several minutes are available for prepressing and sealing the edge of a bent glass sheet sandwich assembled at the assembly station, it is prudent to complete the prepressing step as soon as possible after completing the assembly operation.

Many factors contribute to obtaining acceptable sandwiches of bent glass sheets and a flexible interlayer sheet. The side edge alignment rolls 80 and 89 and the linear end edge alignment rolls 115 of the present invention are mounted on generally vertically oriented guide rolls and rise with the bent glass sheet pair to maintain alignment of the bent glass sheet pair until the vacuum cups engage the bent upper and lower glass sheets by vacuum. The linear rotating rolls 115 which comprise the end edge alignment means provide end edge engagement for shaped glass sheets by moving longitudinally to facilitate longitudinal alignment of the bent glass sheet pair relative to the assembly station. The pivotal mounting adjustment of the end edge engaging rolls in pairs about common axes enables the pairs to move in unison to align and orient each end edge of the bent glass sheets regardless of whether they extend obliquely or normal to the length of the sheets. The use of a set of upper vacuum cups to engage the top surface of the upper glass sheet and a set of lower vacuum cups to engage the bottom surface of the lower glass sheet after the bent glass sheet pair are oriented and aligned by the edge engaging rolls maintains the bent glass sheets in vertical alignment with the vertically extending space containing the alignment position and permits the separation of the bent glass sheets from one another in exact alignment during the insertion of the flexible interlayer sheet supported by the vacuum mold and released from vacuum support to deposit the flexible interlayer sheet in proper alignment and orientation on the lower bent glass sheet to form a subassembly which becomes a sandwich when the upper bent glass sheet is mounted over the flexible interlayer sheet of the subassembly.

The use of a shaped rotatable vacuum mold of the invention of Valimont and Phares covered in copending U.S. patent application Ser. No. 287,600 having curved walls conforming in shape to that of the bent glass sheets with means to move said vacuum mold from a convex elevational configuration at the mold loading station to a concave elevational configuration at the assembly station enables an operator to load a flexible interlayer sheet on the mold at said mold loading station in positions to locate the bent glass sheet pair to receive said pivoted flexible interlayer sheet onto a shaped glass sheet of concave elevation at said assembly station in proper orientation and alignment without wrinkling the flexible interlayer sheet.

The use of spring biased vacuum cups facing the central portion of the lower glass sheet as taught in the Valimont and Kelly invention covered in copending U.S. patent application Ser. No. 287,600 provides an upward bias that temporarily distorts the lower bent glass sheet upwardly when the flexible interlayer sheet is applied thereto and temporarily distorts the subassembly when the upper bent glass sheet is lowered thereagainst. These temporary distortions help remove entrapped air and other fluids from the interfacial surfaces of adjacent sheets of the sandwich.

The various features all assist in making possible the automatic assembly of a bent glass-plastic sandwich from a pair of bent glass sheets that separates the bent glass sheets, applies the flexible interlayer sheet against one of the bent glass sheets to form a subassembly and applies the other bent glass sheet to the exposed surface of the interlayer sheet before the residual heat in the glass sheets that developed during their bending is dissipated to the extent that the glass sheet become too cold on engaging the interlayer sheet to make the interlayer sheet tacky. Providing assembly apparatus that completes the transfer and assembly in 35 seconds or less insures this desired result.

While the specific embodiment described relates to assembling a sandwich comprising a pair of bent glass sheets of conforming configuration with a sheet of flexible interlayer material therebetween, and a subassembly of a single bent glass sheet and a sheet of flexible interlayer material is assembled during the assembly of said sandwich, it is understood that the present invention also comprehends that the subassembly may be the resulting product desired. Such a subassembly may be fabricated into a bilayer windshield, particularly when the flexible interlayer material is composed of polyurethane.

It is also within the gist of this invention to orient the bent glass sheet pair and the vacuum mold to have their longitudinal dimensions extend transverse to the path defined by the cross conveyor. It is also within the gist of this invention to have the conveyor that connects the bending mold unloading station at the bending lehr exit with the assembly station to extend as a longitudinal continuation of the conveyor through the bending lehr instead of extending transversely of the bending lehr conveyor as in the illustrative embodiment.

The illustrative embodiment also includes a device to transfer a vacuum mold from a vacuum mold loading station to the assembly station. It is also convenient for loading the vacuum mold with a flexible sheet of interlayer material to orient the mold to have a convex elevational configuration to facilitate loading a flexible sheet of interlayer material in unwrinkled condition thereon and to pivot the mold into a concave elevational configuration conforming to that at which the bent glass sheets are supported for assembly. While it is more convenient and simpler to pivot the vacuum mold about a single axis as depicted in the illustrative embodiment, it is also within the gist of this development to orient the vacuum mold about a vertical axis as well as a horizontal axis to bring the vacuum mold into alignment with one or more bent glass sheets supported with their length extending transverse to the conveyor path, instead of longitudinally of the path as in the illustrative embodiment.

The illustrative embodiment of assembly apparatus described herein is capable of aligning and assembling a family of windshield patterns having a range of sizes (lengths and widths), various outlines including obliquely extending end edges at a range of oblique angles within certain limits, various depths of bend and various angles of bend wherein the tangent at the longitudinal end of the sandwich assembled makes an angle with the tangent to the main portion of the sandwich that varies within certain limits. The illustrative embodiment is also capable of aligning and assembling sandwiches having asymmetrical shapes with respect to either their longitudinal axis, their transverse axis or both of these axes.

The form of the invention shown and described in this disclosure represents an illustrative preferred embodiment of apparatus containing the present invention and several variations thereof. It is also understood that various changes may be made without departing from the gist of the invention as defined in the claimed subject matter which follows. For example, the specific preferred embodiment describes an assembly operation in which bent glass sheets are oriented in an essentially horizontal orientation to have a concave elevational configuration during assembly of the sandwich. It is apparent that oblique and vertical orientations may be maintained by edge alignment means cooperating with opposed sets of vacuum cups used in cooperation with a shaped vacuum mold having an elevational configuration conforming to those of the conforming glass sheets with means to move the mold from a mold loading station to an assembly station where the mold assumes the orientation of support for the bent glass sheets. It is also understood that the combination of method steps described may be modified without departing from the gist of the invention defined therein as follows.

What is claimed is:

1. Apparatus for aligning and bonding a pair of bent glass sheets comprising an upper bent glass sheet and a lower bent glass sheet of matching concave elevational configuration at an assembly station comprising means for supporting said pair of bent glass sheets on a support at a lower level, means comprising a pair of transversely spaced, linear rotating rolls mounted for free rotation about oblique axes extending approximately parallel to the thickness of corresponding end edge surfaces adjacent thereto for engaging each of the opposite longitudinal end edge surfaces of said bent glass sheets at transversely spaced portions at an upper level to align said glass sheets longitudinally of said assembly station, means including a pair of side edge aligning rolls for engaging each of the opposite side edges of said sheets at longitudinally spaced portions at a lower level to align said glass sheets transversely of said assembly station, means to retract said linear rotating rolls for disengaging said linear rotating rolls from engagement with said longitudinl end edge portions, a first set of vacuum cups, means to lift said first set of vacuum cups into position for lifting said bent glass sheets in unison from said support on said first set of vacuum cups while maintaining said side edge alignment rolls in engagement with said opposite side edge portions, a second set of vacuum cups, means to lower said second set of vacuum cups into position for engaging the top surface of the upper bent glass sheet of said pair with said second set of vacuum cups, means for applying vacuum to said cups to hold the engaged glass sheet surfaces thereagainst, means for separating said side edge alignment rolls from said side edges, means to separate said sets of vacuum cups from one another while applying vacuum thereto for separating said bent glass sheets in a direction of their thickness to form a gap between said glass sheets at said assembly station sufficiently wide for inserting a sheet of flexible interlayer material into said gap, means for inserting said sheet of flexible interlayer material into said gap into a position of alignment over said lower bent glass sheet and means urging said sets of vacuum cups toward one another for assembling said glass sheets to form a sandwich with said sheets of flexible interlayer material, and means to apply sufficient heat and pressure to laminate said sandwich.

2. Apparatus as in claim 1 further including means to move at least one of said pairs of said side edge alignment rolls in a transverse direction between transversely spaced positions separated from one another by distances greater than the width of said bent glass sheets and glass side edge portion engaging positions wherein the side edge alignment rolls of each pair are transversely spaced from corresponding side edge alignment rolls of said other pair by a transverse distance approximately equal to the transverse distance between side edge portions engaged by corresponding side edge engaging rolls of said pairs.

3. Apparatus as in claim 2, further including means to move the other of said pairs of side edge alignment rolls in a transverse direction opposite to the transverse direction of movement for said one of said pairs of side edge alignment rolls.

4. Apparatus as in claim 2, further comprising a vertical shaft for each of said side edge alignment rolls, wherein each of said side edge alignment rolls is mounted on a different one of said shafts for slidable vertical movement upwardly in response to upward movement of said bent glass sheet when the latter are engaged by said side edge alignment rolls and for slidable downward vertical movement when the side edge aligmnent rolls disengage from said glass sheets, and stop means for supporting said side edge alignment rolls in positions resulting from said slidable downward vertical movement that are aligned with said horizontal support.

5. Apparatus as in claim 3, further comprising a vertical shaft for each of said side edge alignment rolls, wherein each of said side edge alignment rolls is mounted on a different one of said shafts for slidable vertical movement upwardly in response to upward movement of said bent glass sheet when the latter are engaged by said side edge alignment rolls and for slidable downward vertical movement when the side edge alignment rolls disengage from said glass sheets, and stop means for supporting said side edge alignment rolls in positions resulting from said slidable downward vertical movement that are aligned with said horizontal support.

6. Apparatus as in claim 4, wherein said horizontal support comprises longitudinally spaced conveyor rolls, further including means movable vertically between certain adjacent of said conveyor rolls for lifting the bottom surface of said lower bent glass sheet from said conveyor rolls when said linear rotating rolls are in their said positions of relatively greater longitudinal spacing out of contact with the longitudinal end edges of said bent glass sheets and said side edge aligning rolls are in their glass engaging positions, wherein said side edge aligning rolls are lifted along said vertical posts in unison with said bent glass sheets to maintain said bent glass sheets in transverse alignment during said lifting.

7. Apparatus as in claim 6, wherein said movable lifting means comprises said first set of vacuum cups adapted to engage the bottom surface of the lower bent glass sheet of said pair, said apparatus further including said second set of vacuum cups adapted to engage the top surface of the upper bent glass sheet of said pair, means to connect said sets of vacuum cups to vacuum source means, means to apply vacuum to said first and second sets of vacuum cups to hold said engaged bent glass sheet surfaces thereagainst, to maintain said pair of bent glass sheets in alignment with the position of alignment of said bent glass sheets obtained by engaging said longitudinal end edge portions with said linear rotating rolls and by engaging said side edge portions with said side edge alignment rolls even when said linear rotating rolls are moved to said longitudinally spaced positions of relatively greater longitudinal spacing and to said transversely spaced positions separated from one another by distances greater than the width of said bent glass sheets.

8. Apparatus as in claim 7, further including means to move at least one of said sets of said vacuum cups as a unit relative to the other of said sets of said vacuum cups in a direction such as to maintain said alignment between said pair of bent glass sheets while applying vacuum through said vacuum cups.

9. Apparatus as in claim 8, further including a vacuum mold having an apertured wall having a configuration conforming to the conforming shapes of said bent glass sheets, means adapted to couple said mold to a source of vacuum whereby said apertured wall is adapted to support said sheet of flexible interlayer material thereagainst, and means to move said vacuum mold into a position of alignment with said bent lower glass sheet.

10. Apparatus as in claim 9, further including means to release said vacuum on said vacuum mold to permit said sheet of flexible interlayer material to separate therefrom and to deposit said sheet of flexible interlayer material onto said lower bent glass sheet to form a subassembly.

11. Apparatus as in claim 10, further including means to remove said vacuum mold from said subassembly and to move said sets of vacuum cups into closer relation to one another to engage said upper glass sheet against said sheet of flexible interlayer material of said subassembly to convert said subassembly to a sandwich.

12. Apparatus as in claim 1, including means for moving said upper bent glass sheet from said lower glass sheet in a direction parallel to the direction of the thickness of said bent glass sheets in unison to retain said upper and lower bent glass sheets in alignment with one another during their separation.

13. Apparatus as in claim 1, including means for lifting said side edge alignment rolls in unison while lifting said pair of bent glass sheets with said side edge alignment rolls in engagement with said opposite side edges.

14. Apparatus as in claim 13, further including means for lowering said side edge alignment rolls to positions intersecting a level occupied by said support when said side edge alignment rolls are separated from said side edges.

15. Apparatus as in claim 1, wherein said bonding means comprises an autoclave for finally laminating said bent glass sheets to said sheet of flexible interlayer material.

16. Apparatus as in claim 15, wherein said bonding means comprises means for prepressing said bent glass sheets and said flexible sheet of interlayer material comprises a roll pressing apparatus for treating said sandwich prior to its exposure to said autoclave.

* * * * *